(12) United States Patent
Williams

(10) Patent No.: US 9,108,590 B2
(45) Date of Patent: Aug. 18, 2015

(54) AIRBAG WITH ACTIVE VENT

(71) Applicant: Autoliv ASP, Inc., Ogden, UT (US)

(72) Inventor: Jeffrey D. Williams, Roy, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 14/242,707

(22) Filed: Apr. 1, 2014

(65) Prior Publication Data

US 2014/0300094 A1    Oct. 9, 2014

Related U.S. Application Data

(60) Provisional application No. 61/808,151, filed on Apr. 3, 2013.

(51) Int. Cl.
  *B60R 21/239* (2006.01)
  *B60R 21/276* (2006.01)
  *B60R 21/2338* (2011.01)

(52) U.S. Cl.
  CPC ....... *B60R 21/239* (2013.01); *B60R 2021/2395* (2013.01); *B60R 2021/23382* (2013.01); *B60R 2021/2765* (2013.01)

(58) Field of Classification Search
  CPC  B60R 21/2338; B60R 21/239; B60R 21/276; B60R 2021/23382; B60R 2021/2765
  USPC .............................................. 280/739, 743.2
  See application file for complete search history.

(56) References Cited

U.S. PATENT DOCUMENTS

| | | | |
|---|---|---|---|
| 6,932,385 B2 * | 8/2005 | Hawthorn et al. | 280/739 |
| 7,328,915 B2 * | 2/2008 | Smith et al. | 280/739 |
| 7,377,546 B2 | 5/2008 | Fischer et al. | |
| 7,607,690 B2 * | 10/2009 | Abe et al. | 280/739 |
| 7,690,681 B2 * | 4/2010 | Hall et al. | 280/739 |
| 7,726,685 B2 | 6/2010 | Abe et al. | |
| 7,845,681 B2 * | 12/2010 | Abe et al. | 280/743.1 |
| 8,070,183 B2 * | 12/2011 | Kumagai et al. | 280/743.2 |
| 8,353,532 B2 | 1/2013 | Abe et al. | |
| 8,371,612 B2 | 2/2013 | Williams | |
| 8,678,431 B2 | 3/2014 | Fischer et al. | |
| 8,684,404 B2 * | 4/2014 | Fischer et al. | 280/739 |
| 8,696,022 B2 * | 4/2014 | Fischer et al. | 280/739 |
| 2005/0127648 A1 | 6/2005 | Fischer et al. | |
| 2005/0248137 A1 * | 11/2005 | Delventhal et al. | 280/739 |
| 2006/0071462 A1 | 4/2006 | Smith et al. | |
| 2007/0145729 A1 * | 6/2007 | Ishiguro et al. | 280/739 |

(Continued)

FOREIGN PATENT DOCUMENTS

FR    2757465    6/1998

*Primary Examiner* — Paul N Dickson
*Assistant Examiner* — Timothy Wilhelm
(74) *Attorney, Agent, or Firm* — Stoel Rives LLP

(57) ABSTRACT

Airbag assemblies and active vents for airbag assemblies are disclosed. An airbag assembly can include an airbag cushion that defines an inflatable chamber and an active vent that comprises an aperture and a patch configured to plug the aperture. A first control tether is coupled to the patch and coupled to the airbag cushion. The first control tether is drawn taut as the cushion expands during deployment to draw the patch toward the aperture from a first position that allows unobstructed venting through the aperture to a second position that obstructs venting through the aperture. The first control tether, or a second control tether, is configured to be drawn taut to close the active vent. Responsive to impact with the airbag cushion, a control tether is configured to slacken to open the active vent.

27 Claims, 26 Drawing Sheets

(56) References Cited

U.S. PATENT DOCUMENTS

| | | |
|---|---|---|
| 2009/0121460 A1 | 5/2009 | Abe et al. |
| 2009/0121461 A1 | 5/2009 | Abe et al. |
| 2010/0032931 A1 | 2/2010 | Kumagai et al. |
| 2010/0109303 A1 | 5/2010 | Abe et al. |
| 2011/0062693 A1 | 3/2011 | Williams |
| 2011/0133437 A1 | 6/2011 | Jang et al. |
| 2011/0309605 A1 | 12/2011 | Kumagai |
| 2012/0074677 A1 * | 3/2012 | Hiruta et al. .................. 280/739 |
| 2013/0026744 A1 | 1/2013 | Fischer et al. |

* cited by examiner

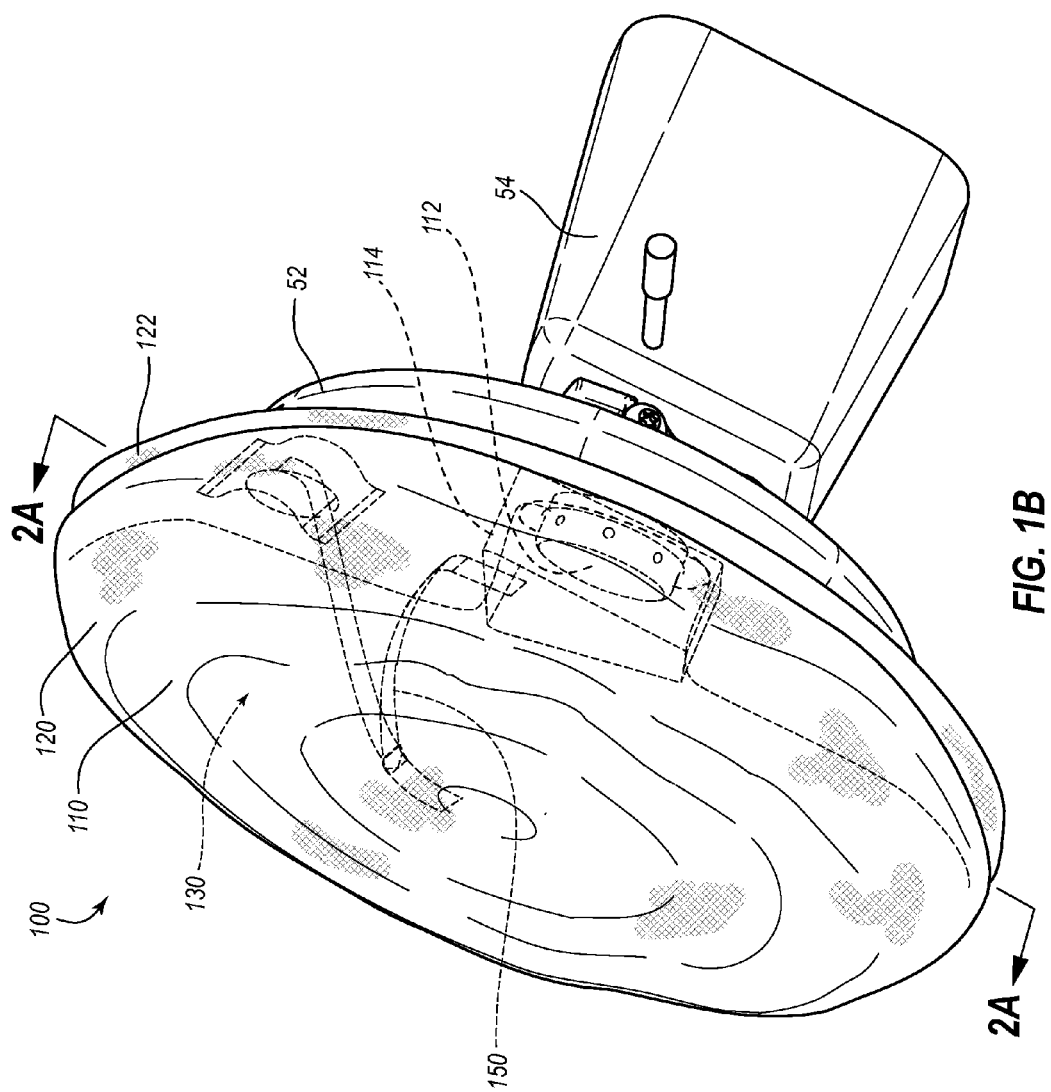

US 9,108,590 B2

AIRBAG WITH ACTIVE VENT

RELATED APPLICATION

This application claims priority to U.S. Provisional Patent Application No. 61/808,151, titled AIRBAGS WITH PLUGS FOR ACTIVE VENTING, filed on Apr. 3, 2013, which is hereby incorporated herein by reference in its entirety.

TECHNICAL FIELD

The present disclosure relates generally to the field of automotive protective systems. More specifically, the present disclosure relates to inflatable airbag cushion assemblies.

BACKGROUND

Airbags can be mounted in a steering wheel or other vehicular structure and deployed so as to prevent a vehicle occupant from impacting the vehicular structure in a collision event. In some instances, the airbags can suffer from one or more drawbacks or may perform less than optimally in one or more respects. Certain embodiments disclosed herein can address one or more of these issues.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the disclosure scope, the embodiments will be described and explained with specificity and detail in reference to the accompanying drawings, in which:

FIG. 1B is another perspective view of the airbag assembly of FIG. 1A showing the airbag in a deployed state;

DETAILED DESCRIPTION

Figure 1A:
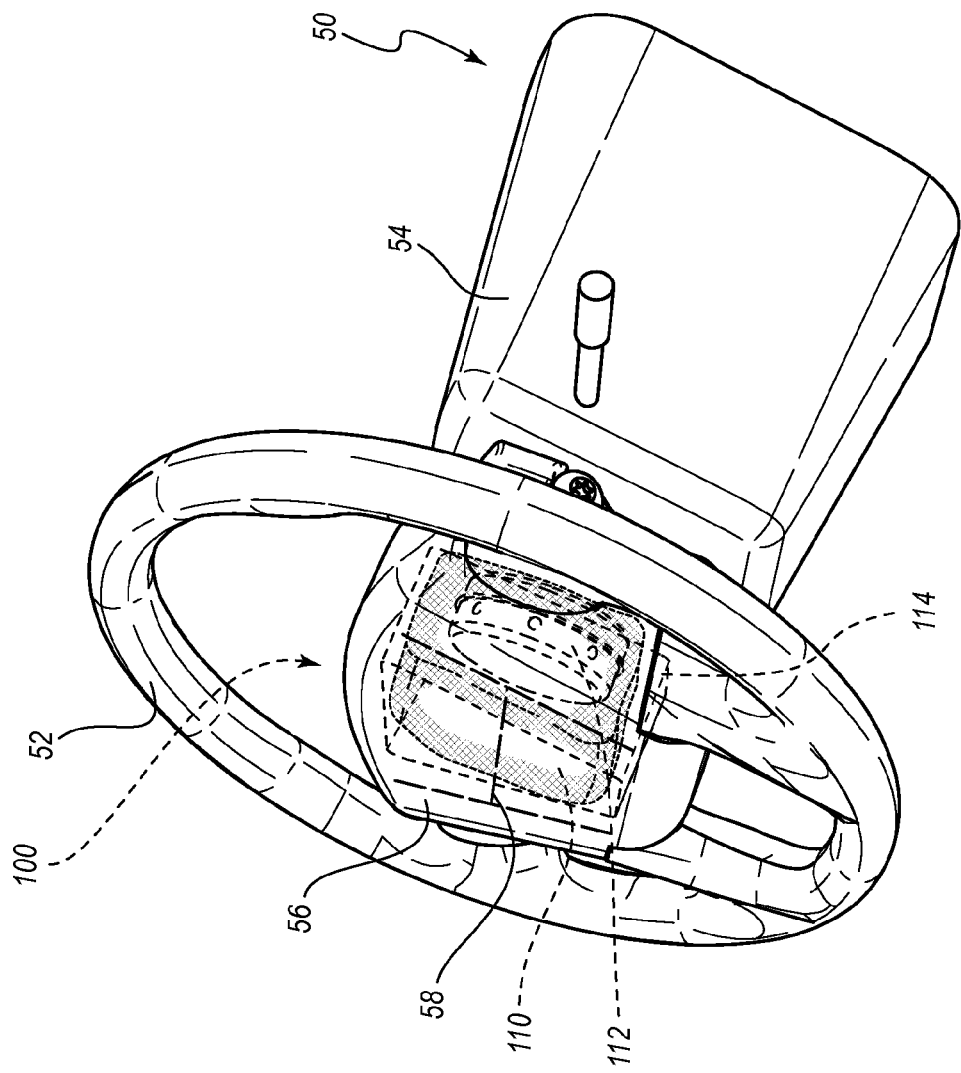
FIG. 1A is a perspective view of an embodiment of an airbag assembly mounted in a vehicle, wherein an embodiment of an airbag is shown in a packaged or undeployed state.

Described herein are embodiments of an airbag cushion and venting mechanism. As those of skill in the art will appreciate, the disclosed principles and features may be applied to and used with a variety of airbag deployment systems including frontal driver and passenger airbags, knee airbags, overhead airbags, curtain airbags, and the like. Thus, although an embodiment of a driver airbag is shown in the drawings, it should be recognized that the disclosure is not limited to this specific context, and the principles and features described can apply to airbag cushions of various shapes, sizes, and configurations. The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other and/or coupled to each other by a fastener of any suitable variety (e.g., mounting hardware, adhesive, stitching), regardless of whether the fastener extends through additional components. The phrase "fluid communication" is used in its ordinary sense, and is broad enough to refer to arrangements in which a fluid (e.g., a gas and/or a liquid) can flow from one element to another element when the elements are in fluid communication with each other.

Inflatable airbag systems are widely used to reduce or minimize occupant injury in a collision scenario. Airbag modules have been installed at various locations within a vehicle, including, but not limited to, in the steering wheel, in the instrument panel, in the side doors or side seats, adjacent to the roof rail, in an overhead position, or at the knee or leg position. In the following disclosure, "airbag" generally refers to an inflatable front airbag, such as a driver airbag, although the principles discussed may apply to other airbag types in other embodiments.

Front airbag cushions are frequently located in an instrument panel or a steering wheel in front of an occupant. During installation, the airbags are rolled and/or folded, and may be retained in the packaged state behind a cosmetic cover. During a collision, an airbag cushion can inflate and deploy through the cover. The airbag cushion can deploy toward the occupant and provide a restraint.

Full inflation of an airbag may not always be desired. For example, partial inflation may offer better protection with less chance of injury when the occupant being protected by the airbag cushion is, for example, a child, a baby in a rear-facing car seat, or an adult positioned too close to the air bag cushion. Such conditions, and others, may be referred to as out-of-position (OOP) conditions. Certain embodiments described herein provide an airbag cushion that can respond to an occupant's position and can vent according thereto to avoid excessive impact to an occupant in an OOP condition upon deployment of the airbag cushion.

Certain embodiments include an active vent that is optionally oriented in an OOP venting state to permit venting during OOP conditions. Certain embodiments of the active vents can include an opening or aperture for venting gas and a patch plug that selectively cooperates with the aperture to either close the aperture or permit venting through the aperture. The term active, a used herein, may refer to activity a vent embodiment to transition between two or more states or configurations. The term active may not necessarily refer to a vent that receives an input (e.g., signal) from an electronic controller or sensor to activate. Rather, the embodiments disclosed and described herein provide active venting without any input or signal from an electronic controller or sensor. Rather, the active venting occurs in conjunction with changes in the state or configuration of the airbag (e.g., changes in shape, size, or the like resulting from inflation and/or deflation).

In some embodiments of an active vent, the patch plug is coupled with a tether that can pull the plug into a restraint venting state and/or a closed state to permit normal or full inflation of the airbag cushion when the occupant is not in an OOP condition. Stated otherwise, the closeable vent may be partially and/or fully closed via a component such as a control tether. The control tether may be connected at one end to a portion of the patch plug and may be connected to another portion of the airbag (e.g., a front panel that is configured to receive an occupant during a collision event), which may be at an opposing region of the airbag cushion.

In certain other embodiments, the control tether may be connected at one end to a portion of the patch plug and may be connected at the other end to another tether component (e.g., an occupant tether, a depth-delimiting tether or a stabilizing tether) of an airbag assembly. A position at which the control tether connects to the other tether component may impact venting characteristics through an opening or aperture corresponding to the patch plug. The position at which the connection of the control tether connects to the other tether component may be adjusted to tune the venting or ride-down characteristics of the airbag.

If an occupant is in close proximity to the deploying airbag and restricts normal inflation, the closeable vent may remain open and allow gas to rapidly escape. If the occupant is in a normal position and inflation is unrestricted, the tension pulls on the tether to close the closeable vent. Closure retains gas for normal occupant restraint. Thus, the closeable vent may be used as a variable feature in OOP conditions and in normal restraint conditions. In this manner, the airbag cushion is sensitive to obstructive expansion of the cushion.

Accordingly, an active discrete venting option, that can be open initially (e.g., during early stages of airbag deployment) to reduce the risk of injury to OOP occupants, is desirable.

In certain embodiments, the vent may be configured to close quickly to retain the inflation gases within the inflatable cushion for a maximum efficiency or other desirable efficiency in restraining a normally situated (e.g., non-OOP) occupant.

In certain other embodiments, the selectively closeable vent may not close throughout early stages of a full airbag deployment event when the occupant is in an OOP condition; however, the vent may close during later stages of the airbag deployment event when the occupant is normally situated.

In certain embodiments, once a normally seated occupant begins to load the airbag, the vent (which is in a closed state) may be returned to an open state to allow for desired venting that can provide desired ride-down characteristics to reduce injury. Accordingly, in various embodiments, a selectively closeable vent, or "active vent," may transition from an open OOP venting state during early stages of deployment to a restraint venting state and/or a closed state to permit full and/or desired inflation of the airbag cushion, and then back to an open restraint venting state during ride-down of a vehicle occupant after the occupant has impacted the airbag. The same airbag may nevertheless be deployable in a different manner that is safer for OOP occupants. For example, in some OOP situations, the selectively closeable vent may be open in an OOP venting state in the early stages of deployment, may remain open in the OOP venting state during intermediate stages of deployment due to early contact with a vehicle occupant in an OOP condition, and may remain open through the subsequent ride-down of the vehicle occupant. In some instances, the selectively closeable vent may remain open throughout an entire deployment event for an OOP occupant.

FIGS. 1A and 1B depict an airbag assembly 100 in two different configurations. FIG. 1A depicts airbag assembly 100 in a packaged configuration, and FIG. 1B depicts the airbag assembly 100 in a deployed and inflated configuration. FIGS. 1A-1B further depict a steering wheel 52 and a steering column 54 of a vehicle 50. The steering wheel 52 includes a cover 56, behind which airbag assembly 100 is located. The cover 56 may be of any suitable variety, and may include a tear seam or burst seam 58 through which an airbag can deploy.

The airbag assembly 100 can include an inflatable airbag cushion 110, an inflator 112, and an airbag housing 114. In the illustrated embodiment, the airbag cushion 110 includes a cushioning panel 120, which in the deployed and inflated configuration is generally directed toward an occupant or an occupant position (e.g., a vehicle seat), and may at least partially define a cabin side of the airbag cushion 110. A base panel 122 is located opposite the cushioning panel 120. In the illustrated embodiment, the base panel 122 is adjacent to the steering wheel 52 when the airbag cushion 110 is in the deployed and inflated configuration. The cushioning panel 120 and the base panel 122 may also be referred to as a front panel 120 and a back panel 122, based on the positions of these panels relative to the perspective of the vehicle occupant when the airbag cushion 110 is deployed. The base panel 122 and the cushioning panel 120 cooperate to define an inflatable chamber 130. The panels 120, 122 may also be referred to as airbag cushion membranes, and may be formed of any suitable material. For example, in some embodiments, the panels 120, 122 are formed of a woven nylon fabric. Moreover, a variety of types and configurations of airbag cushion membranes can be utilized in various embodiments. For example, the size, shape, and proportions of the cushion membrane may vary according to its use in different vehicles or different locations within a vehicle.

In some embodiments, the airbag cushion 110 can further include a tether 150, which can be attached to the cushioning panel 120. The tether 150 may be referred to as a depth delimiting tether or a stabilizing tether. The tether 150 can assist with achieving a desired profile of the airbag cushion 110 during deployment, once the airbag cushion 110 is fully inflated, and/or during ride-down of a vehicle occupant after the vehicle occupant impacts the inflated airbag cushion 110. The tether 150 may be formed of any suitable material, such as, for example, any of the materials discussed above with respect to the panels 120, 122. For example, in some embodiments, the tether 150 and the panels 120, 122 may be formed of the same material. In other embodiments, the tether 150 may be formed of a material that is stiffer, thicker, and/or stronger than the material of which the panels 120, 122 are formed.

Figure 2A:
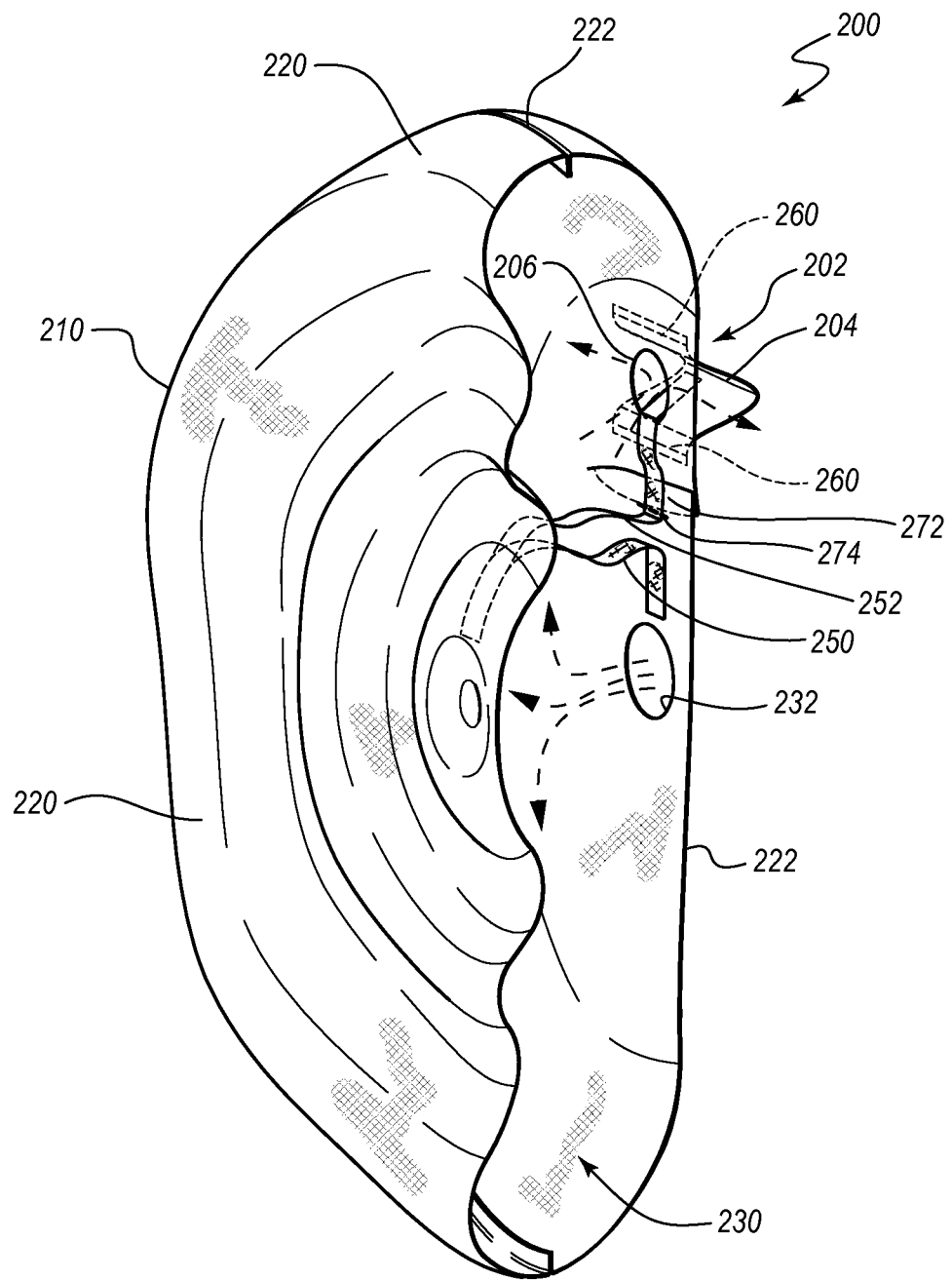
FIG. 2A is a rearwardly directed cross-sectional perspective view of an embodiment of an airbag assembly in which an embodiment of an active vent is initially in an open OOP venting state such that an embodiment of a patch plug is positioned to permit unobstructed egress of inflation gases from an airbag cushion.
Figure 2B:
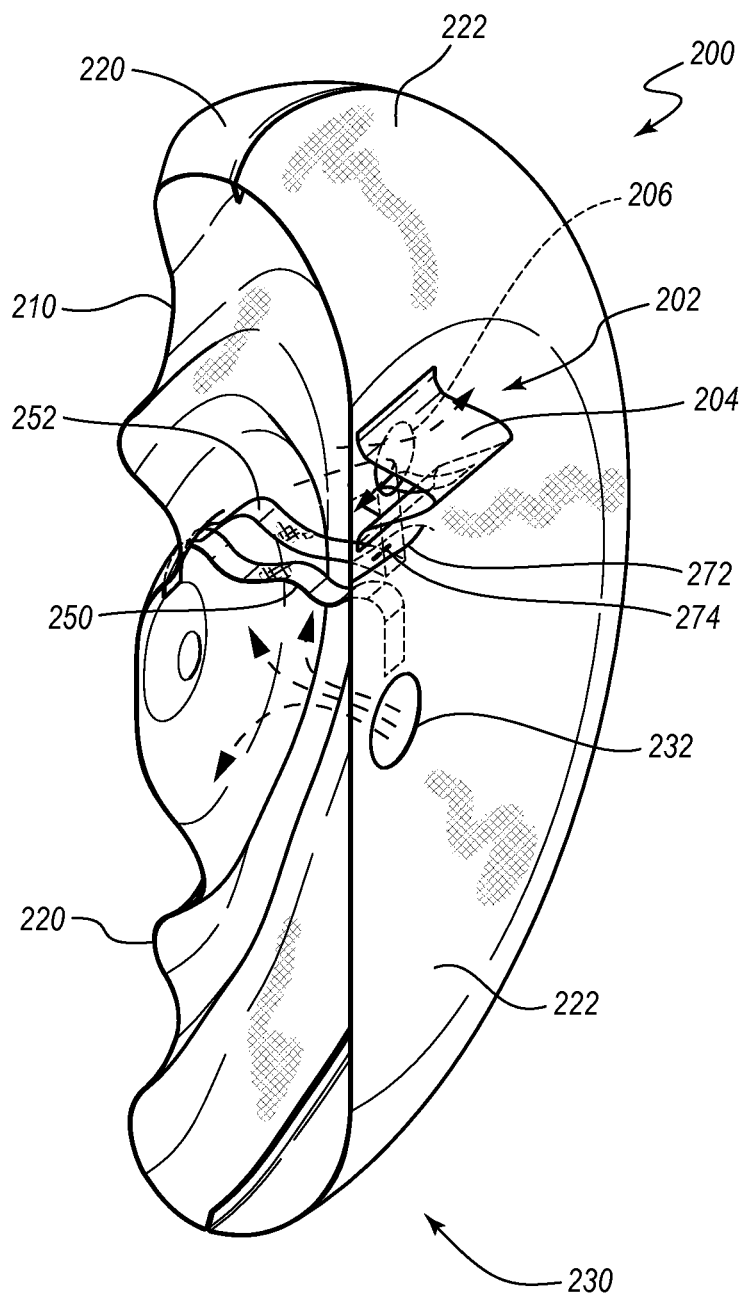
FIG. 2B is a forwardly directed cross-sectional perspective view of the airbag assembly of FIG. 2A in the same operational mode depicted in FIG. 2A.
Figure 2C:
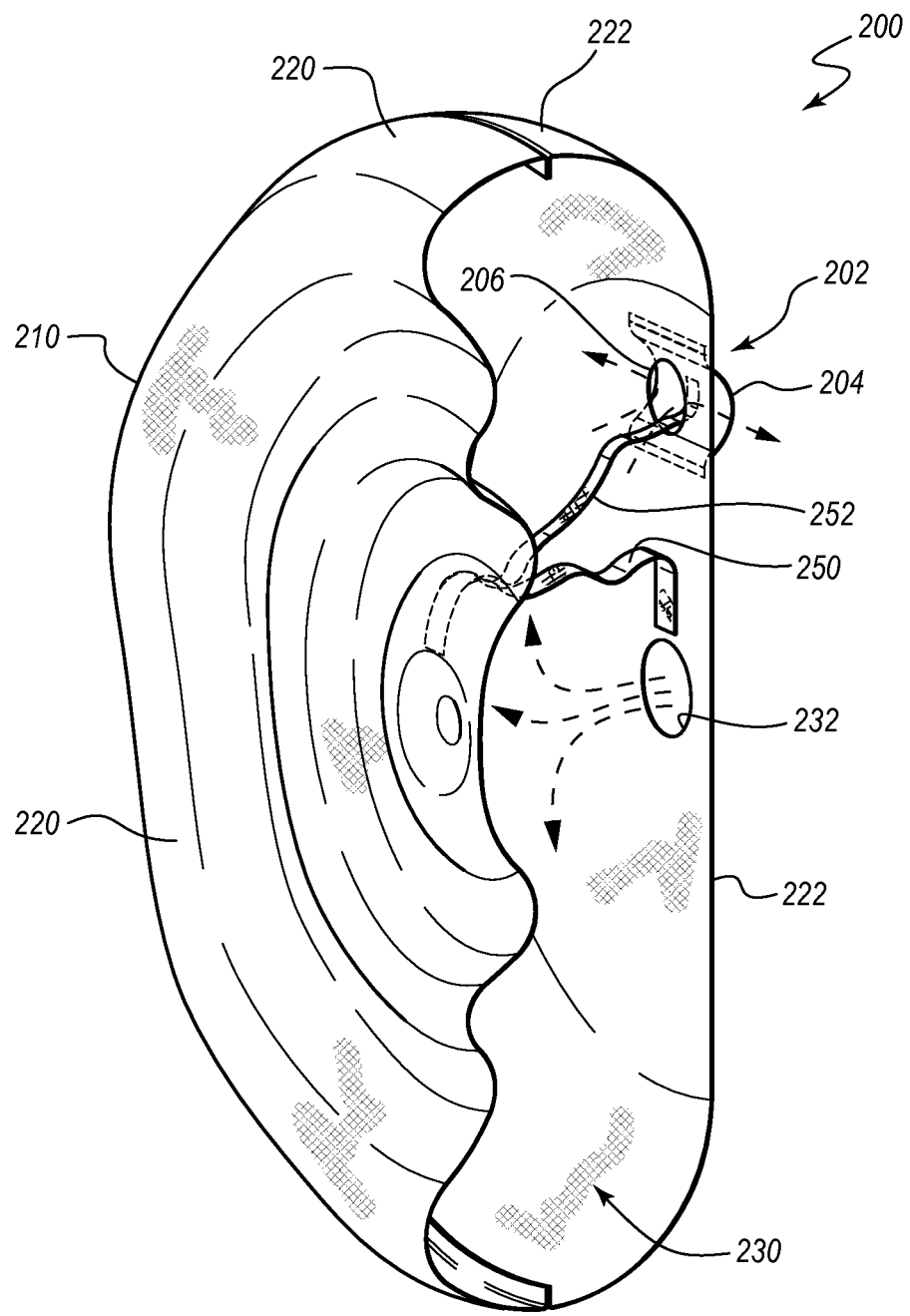
FIG. 2C is a rearwardly directed cross-sectional perspective view of the airbag assembly of FIG. 2A in a partially inflated state in which an embodiment of an active vent is in an open restraint venting state and the active vent includes an embodiment of a patch plug that permits egress of inflation gases from an airbag cushion in the illustrated orientation.
Figure 2D:
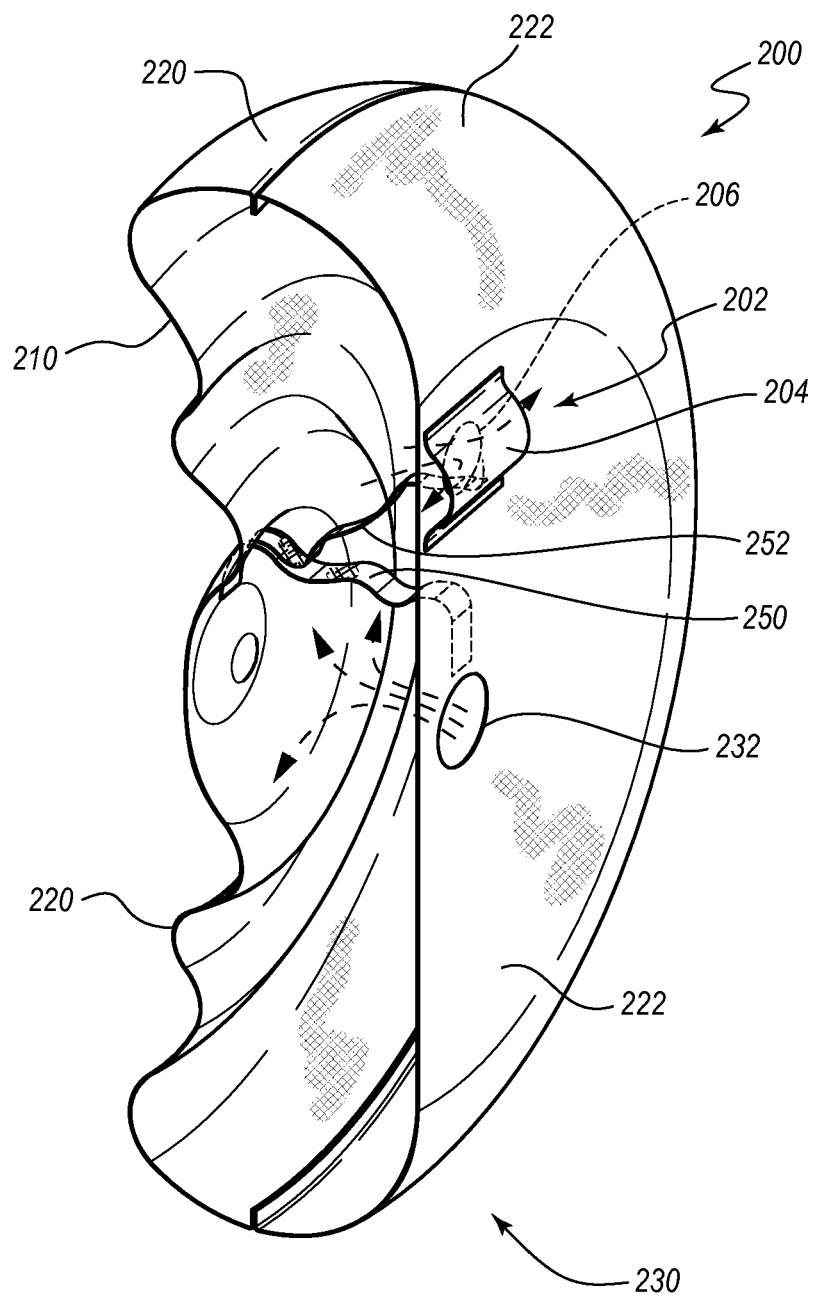
FIG. 2D is a forwardly directed cross-sectional perspective view of the airbag assembly of FIG. 2A in the same operational mode depicted in FIG. 2C.
Figure 3A:
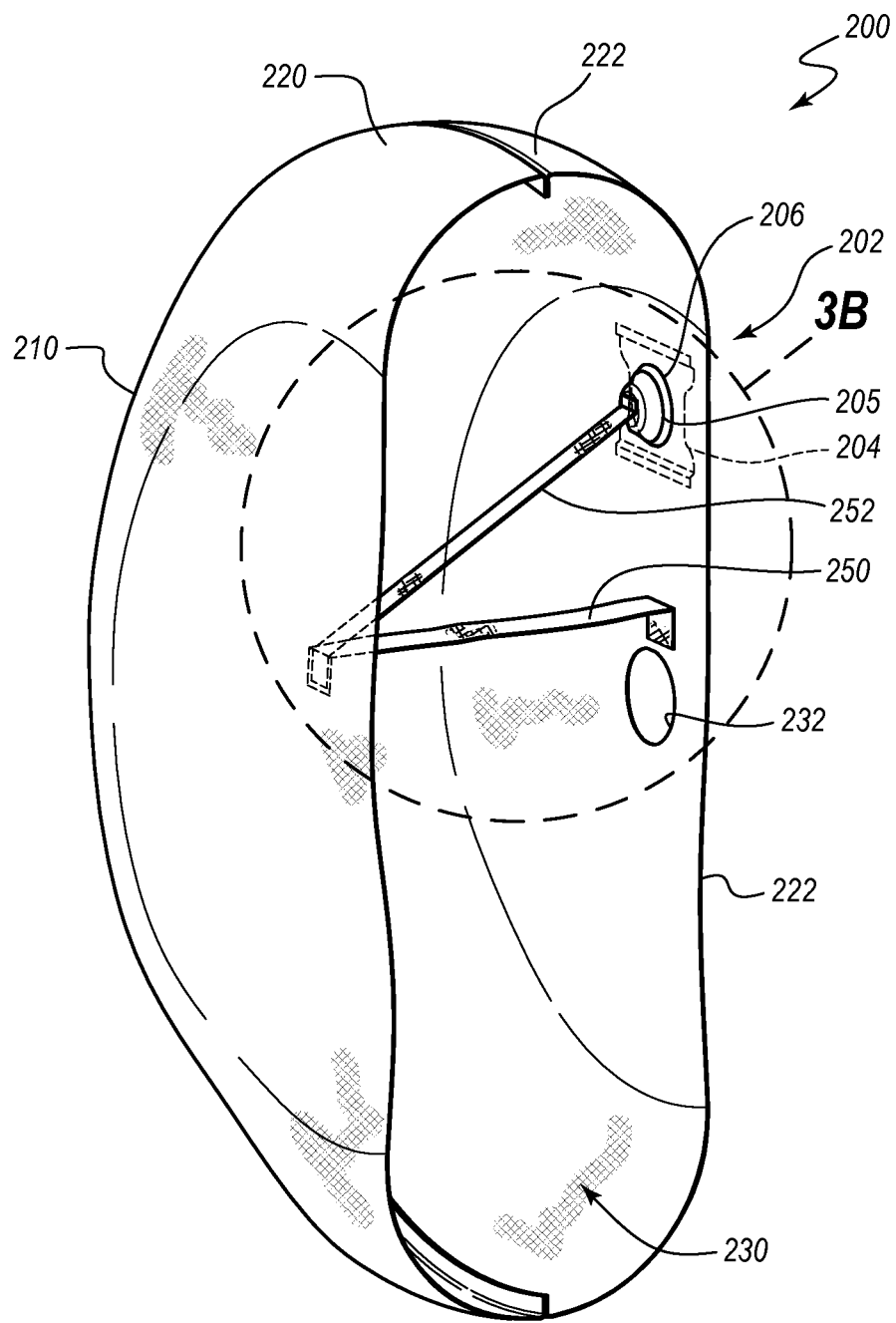
FIG. 3A is a rearwardly directed cross-sectional perspective view of the airbag assembly of FIG. 2A in a fully inflated state, wherein the active vent is in a closed state and the patch plug prevents egress of inflation gases from the airbag cushion.
Figure 3B:
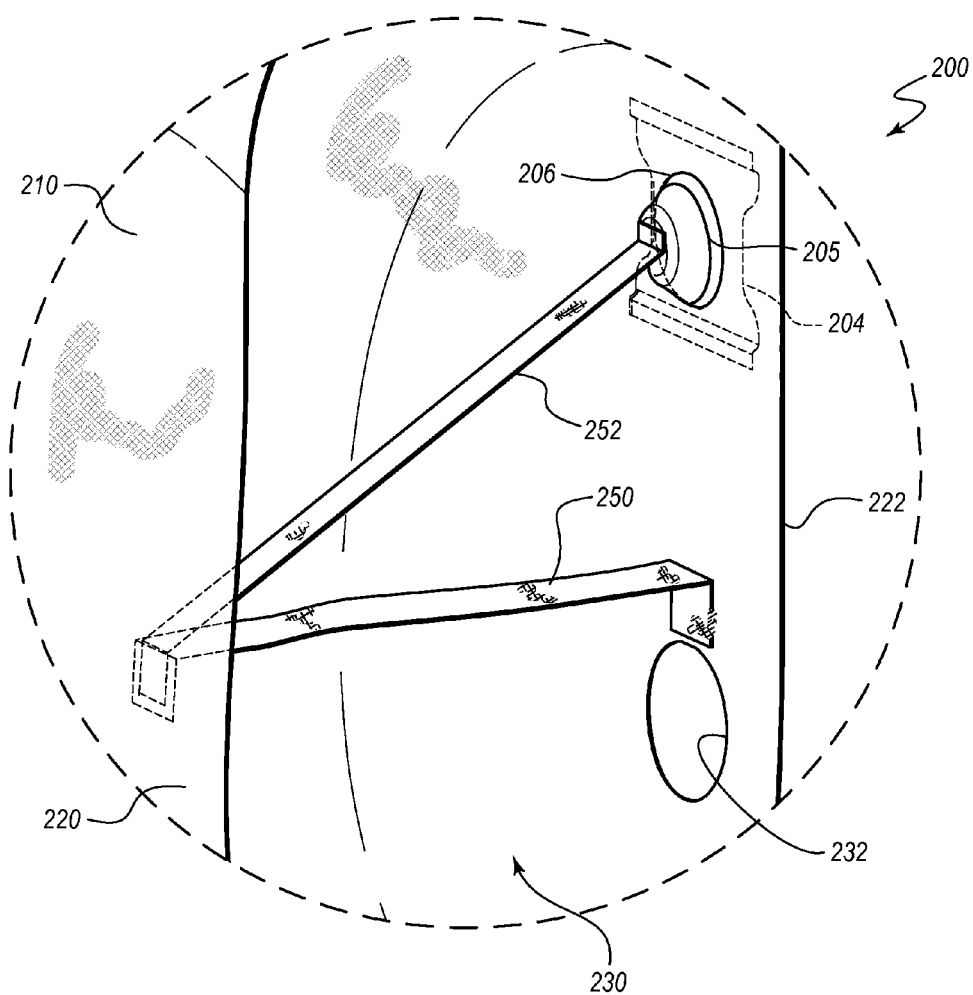
FIG. 3B is an enlarged view of FIG. 3A.
Figure 3C:
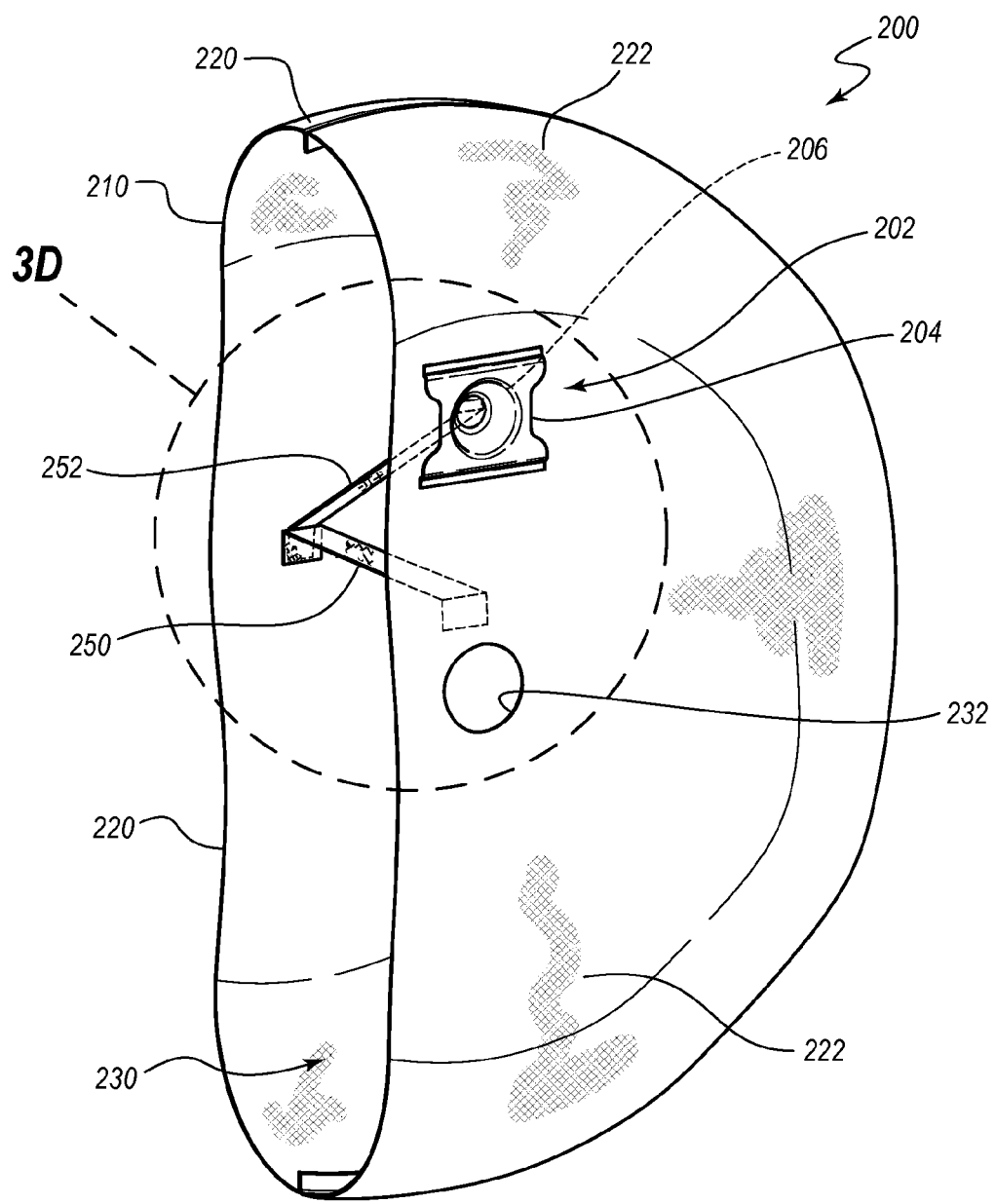
FIG. 3C is a forwardly directed cross-sectional perspective view of the airbag assembly of FIG. 2A in the same operational mode depicted in FIGS. 3A and 3B.
Figure 3D:
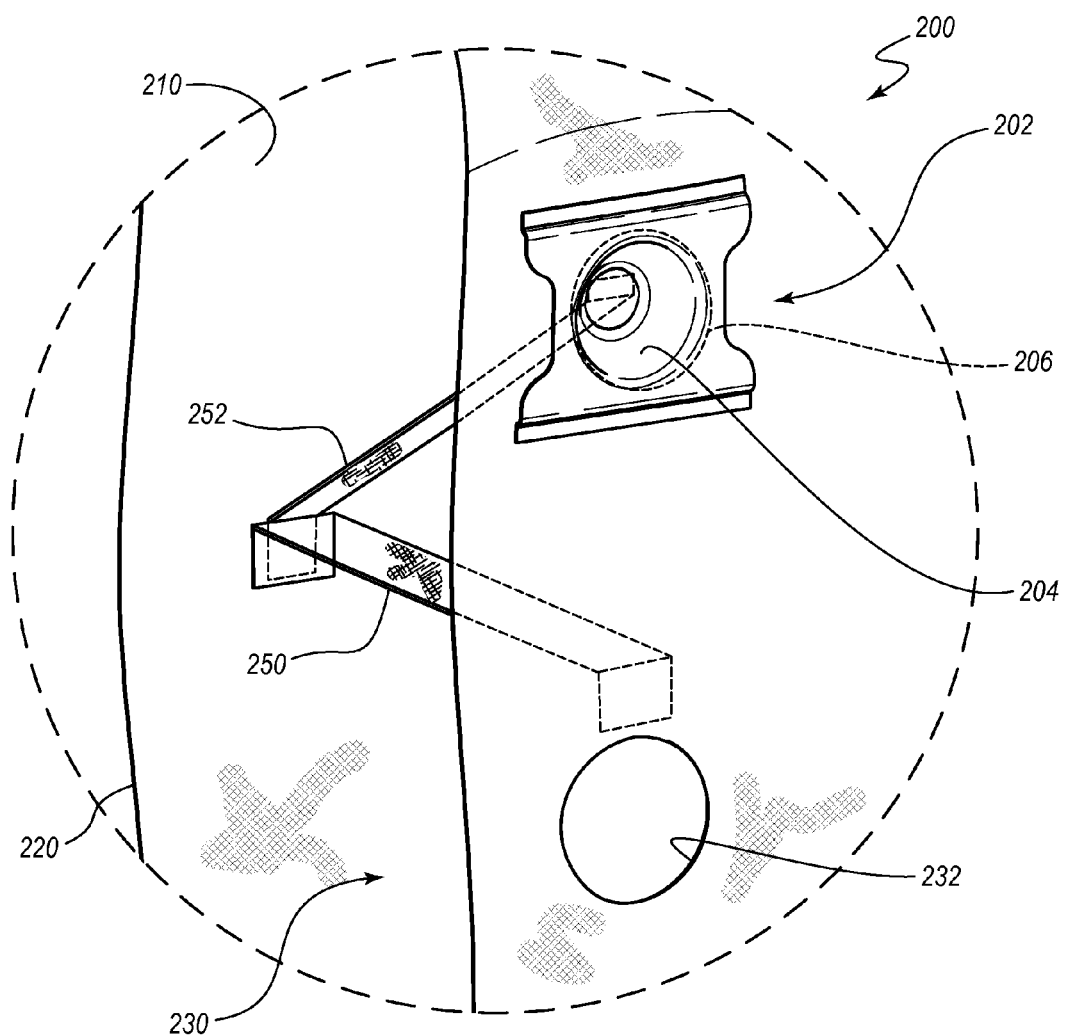
FIG. 3D is an enlarged view of FIG. 3C.
Figure 4:
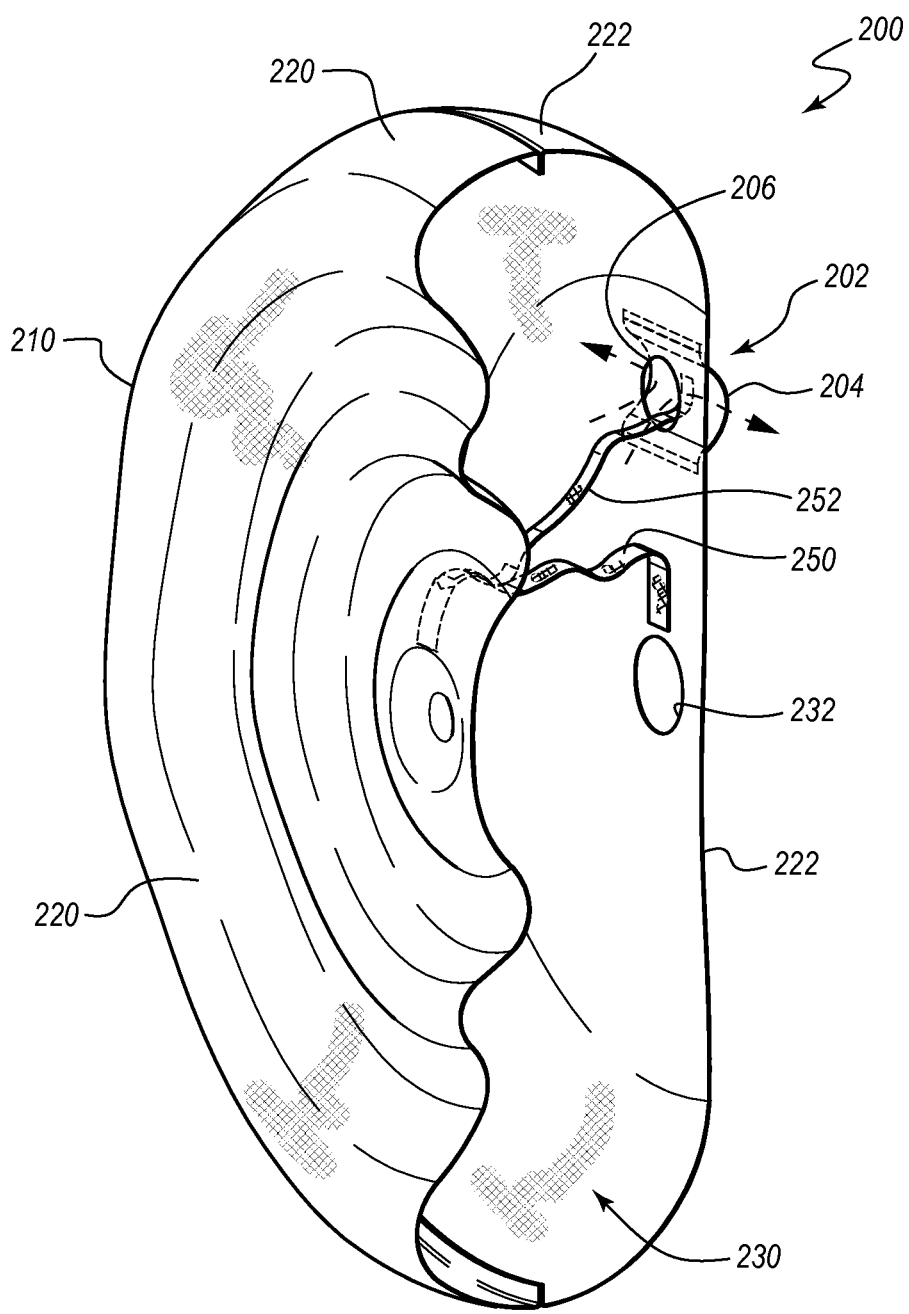
FIG. 4 is a rearwardly directed cross-sectional perspective view of the airbag assembly of FIG. 2A in a ride-down state with the active vent again in an open restraint venting state in which the patch plug permits egress of inflation gases from the airbag cushion.

FIGS. 2A-2D, 3A-3D, and 4 depict an airbag assembly 200, according to an embodiment of the present disclosure. Specifically, FIG. 2A is a rearwardly directed cross-sectional perspective view (along line 2A-2A of FIG. 1B) of an embodiment of an airbag assembly 200 in an early-inflation configuration (e.g., prior to unfolding or during unfolding of an airbag cushion 210) in which an embodiment of an active vent 202 is initially in an open OOP venting state such that a patch 204 is positioned to permit unobstructed egress of inflation gases from an airbag cushion 210. FIG. 2B is a forwardly directed cross-sectional perspective view of the airbag assembly 200 in the same operational mode depicted in FIG. 2A. FIG. 2C is a rearwardly directed cross-sectional perspective view (along line 2A-2A of FIG. 1B) of the airbag assembly 200 in a partially inflated state in which the active vent 202 is in an open restraint venting state and the patch 204 of the active vent 202 is configured to permit egress of inflation gases from an airbag cushion 210 at a rate appropriate for safe occupant ride down. FIG. 2D is a forwardly directed cross-sectional perspective view of the airbag assembly 200 in the same operational mode depicted in FIG. 2C. FIG. 3A is a rearwardly directed cross-sectional perspective view of the airbag assembly 200 in a fully inflated state, wherein the active vent 202 is in a closed state and the patch 204 limits or prevents egress of inflation gases from the airbag cushion 210. FIG. 3B is an enlarged view of FIG. 3A. FIG. 3C is a forwardly directed cross-sectional perspective view of the airbag assembly 200 in the same operational mode depicted in FIGS. 3A and 3B. FIG. 3D is an enlarged view of FIG. 3C. FIG. 4 is a rearwardly directed cross-sectional perspective view of the airbag assembly 200 in a ride-down state, wherein the active vent 202 is again in an open restraint venting state in which the patch 204 permits egress of inflation gases from the airbag cushion 210 at a rate appropriate for safe occupant ride down.

Referring generally and collectively to FIGS. 2A-2D, 3A-3D, and 4, the airbag assembly 200 can include a selectively closable discrete vent (i.e., active vent 202) that includes a plug 204 that is configured to selectively interact with an aperture 206 to close the aperture 206. The plug 204 may comprise a patch 204 that is attached to an airbag cushion 210. The active vent 202 thus may be said to include, in some embodiments, an aperture 206 and a plug 204 or patch 204 that selectively interacts with the aperture 206 to selectively close the aperture 206. The aperture may be sized to allow venting at a rate appropriate to reduce or eliminate injury to a vehicle occupant in an OOP condition.

The patch 204 may be positioned at an exterior of the airbag cushion 210. The patch 204 may be attached to the cushion 210 in any suitable manner, such as via stitching, welding, adhesives, etc. In the embodiment of FIGS. 2A-2D, 3A-3D, and 4, the patch 204 is attached using stitching, such that the active vent 202 comprises two seams 260 disposed on opposite sides of the aperture 206, as shown. The patch 204 may include a vent seal 205 sized similar to a diameter of the aperture 206 to increase sealing of the active vent 202. The vent seal 205 may be formed of coated fabric sized and/or shaped to match the aperture. In other embodiments, the vent seal 205 may be a ring or gasket formed of silicone or other elastomeric material coupled to the patch 204.

In the illustrated embodiment, the patch 204 is attached to a back panel 222 of the airbag cushion 210 at two positions, for example at positions above and below the aperture 206. The two attachment positions may be in an arrangement that can permit the patch 204 to substantially bow outwardly, away from the airbag cushion 210 and out of engagement with the aperture 206, when the active vent 202 is open, which may permit rapid venting of the airbag cushion 210. In other words, two side portions of the patch 204 may be attached to the back panel 222, and a center portion of the patch 204 may be configured to be disposed a distance away from the aperture 206 when the active vent 202 is open, such that the patch 204 does not interact with the aperture 206 and permits egress of gases through the aperture 206. The distance at with the center portion of the patch 204 is initially disposed away from the aperture 206 is sufficient that unobstructed venting may occur through the aperture. Stated differently, a bow in the patch 204 may be sufficiently loose to allow for unobstructed venting of inflation gases through the aperture 206. Due to the size of the aperture 206, the rate of venting may be appropriate for minimizing injury from airbag impact with an occupant in an OOP condition. Upon engagement of a control tether (e.g., control tether 252 discussed below) to draw the patch 204 toward the aperture 206, the patch 204 may begin to partially obstruct venting of inflation gases through the aperture 206. The control tether may first draw the patch 204 to an open restraint venting state in which the patch 204 affects and/or limits egress of inflation gases to a rate appropriate for safe occupant restraint (or ride down).

In certain other embodiments, the patch 204 may be attached to the back panel 222 at two lateral positions on opposite sides of the aperture 206. In still other embodiments, the patch 204 may be attached at three positions (e.g., at three corners of a triangle shape). In still other embodiments, the patch 204 may be attached at four positions (e.g., at four corners of a quadrilateral-shaped patch). Other arrangements are also contemplated.

In the illustrated embodiment, the patch 204 is substantially rectangular and sized to engage with and plug the aperture 206. Initially, the patch 206 may be configured to be disposed in the OOP venting state, which may be configured to allow venting of inflation gases at a rate appropriate to accommodate an OOP condition. The aperture 206 is substantially circular, with a maximum diameter of the circle being less than a minimum width of the patch 204. The patch 204 may be configured to fully cover the aperture 206 when pulled into proximity thereto. In other or further embodiments, the patch 204 may be configured to contact a full periphery of the aperture 206 when inverted through the aperture 206. In other embodiment, the patch 204 may be rectangular with oppositely facing recessed portions such that the patch 204 may be substantially hourglass shaped. In other embodiments, the patch may be circular, triangular, oval, or another shape. Other arrangements are also possible.

In some embodiments, the airbag cushion 210 comprises a front panel 220 and a back panel 222 that may be joined in any suitable manner, such as via stitching. The terms front and back are used relative to the perspective of the vehicle occupant. Thus, the front panel 220 is the panel that will receive the vehicle occupant during impact of the vehicle occupant with the airbag cushion 210, whereas the back panel 222 is the panel that faces away from the vehicle occupant. The back panel 222 may, however, be at a more forward position in the vehicle than the front panel 220. That is, from the reference frame of the vehicle itself, the back panel 222 may in fact be at a position that is in front of the front panel 220. The back panel 222 and the front panel 220 cooperate to define an inflatable chamber 230.

The back panel 222 may include and/or define an inflation aperture 232 that is configured to physically and/or fluidly couple with an inflator (not shown). The inflation aperture 232 permits inflation gases to enter the inflatable chamber 230 of the airbag cushion 210 during a deployment event.

The aperture 206 for the active vent 202 may be positioned in the back panel 222 of the airbag cushion 210, which may be the same panel that includes the inflation aperture 232. In the illustrated embodiment, the aperture 206 for the active vent 202 is spaced from (e.g., positioned above) the inflator aperture 232. In other embodiments the aperture 206 for the active vent 202 may be positioned laterally to the side of or below the inflator aperture 232. In still other embodiments, the aperture 206 may be on a panel (e.g., a side panel) other than the back panel 222.

The airbag assembly 200 may also include an occupant tether 250 (e.g., a stabilizing tether or depth delimiting tether) that extends from the front panel 220 to the back panel 222 and is coupled with each of the front panel 220 and the back panel 222. The occupant tether 250 can assist with achieving a desired profile of the airbag cushion 210 during deployment, once the airbag cushion 210 is fully inflated, and/or during ride-down of a vehicle occupant after the vehicle occupant impacts the inflated airbag cushion 210.

A control tether 252 (or pull cord) may be coupled with the front panel 220 of the airbag cushion 210 and may also be coupled with the patch 204. In some embodiments, the control tether 252 is coupled to the patch 204 at one end and is coupled with the front panel 220 at an opposite end, as depicted in FIGS. 2A-2D, 3A-3D, and 4. Initially, when the airbag cushion 210 is in a folded state, before deployment and/or inflation, the control tether 252 may be in a slack condition with sufficient slack to allow the patch 204 to be in an OOP venting state, which may be fully disengaged, or nearly fully disengaged, from the aperture 206. In other words, the slack in the control tether 252 may be sufficient to allow the patch 204 to be sufficiently displaced from the aperture 206 to allow unobstructed egress of inflation gases through the aperture 206, which may be sized to allow venting at a rate appropriate for an OOP condition.

The initial slack in the control tether 252 may be achieved and maintained through cushion folding (packaging) and early deployment in a number of ways. For example, the airbag cushion 210 may be folded initially to include a tuck or fold 272 that decreases a distance between the patch 204 (and thereby the aperture 206) and the opposite end of the control tether 252 that may be secured to the front panel 220. As another example, the control tether 252 may be tack stitched 274 to secure the control tether to the back panel 222 in a manner that puts at least a portion of the control tether 252 in a slack condition relative to the patch 204 to permit the patch 204 to be initially disposed in the OOP venting state. The tack stitch 274 may be burst as the airbag cushion 210 expands during inflation.

In certain embodiments, once a degree of inflation of the airbag cushion 210 is achieved (e.g., because no OOP condition exists), the active vent 202 may transition out of the OOP venting state. For example, the tuck 272 may be pulled out of the back panel 222 as the cushion 210 expands and/or the tack stitch 274 securing the control tether in a slack condition may be burst. The transition out of the OOP venting state may be permanent, such that through deployment, restraint, and/or ride-down the active vent 202 is limited to transitions between the restraint venting state and the closed state.

In certain other embodiments, the control tether 252 may include an additional branch that extends from the front panel 220 to the back panel 222 and is coupled with each of the front panel 220 and back panel 222. In other words, in certain embodiments, a portion of the control tether 252 may be configured to function as the occupant tether 250 to stabilize and/or delimit the depth of the airbag cushion 210 during deployment of the airbag assembly 200. In certain other embodiments, an occupant tether 250 is not included and the control tether 252 functions to stabilize and delimit the depth of the airbag cushion 210 during deployment. Still other configurations of the control tether 252 and/or occupant tether 250 are possible, such as are described below with reference to other figures.

Operation of the airbag assembly 200 can proceed as described above and as shown in the drawings. For example, in some embodiments, the active vent 202 may be initially open because the control tether 252 is in a slack condition. In some embodiments, the airbag assembly 200 is assembled such that the control tether 252 is originally in the slack condition, such that during the initial stages of airbag inflation, the control tether 252 is slack, such as in FIGS. 2A and 2B. If a vehicle occupant is not in close proximity to the airbag cushion 210 during these early stages of airbag deployment, the airbag cushion 210 is allowed to expand in the direction of the normally seated occupant (e.g., the x-direction). As this expansion occurs, the control tether 252 (or pull cord) tightens to a taut condition. This tightening of the control tether 252 may cause the tuck 272 to be pulled out of the back panel 222 and/or the tack stitch 274 securing the control tether in a slack condition to be burst.

The tightening of the control tether 252 to the taut condition can also pull a portion of the patch 204 through (e.g., internally relative to) the aperture 206 to prevent gas leakage during normal restraint conditions, such as is shown in FIGS. 3A-3D. The vent seal 205 of the patch 204 may engage the perimeter of the aperture 206. Stated otherwise, the control tether 252 that is attached to the patch 204 can become taut, which can invert the patch 204 through the discrete vent and thereby plug or seal the aperture 206 or otherwise close the active vent 202. The plugging may prevent or inhibit egress of the inflation gases through the aperture 206.

The control tether 252 may remain in the taut condition until loading by the normally seated vehicle occupant occurs. Upon such loading, the front panel 220 of the cushion 210 can collapse with the ride-down of the occupant. This translation of the front panel 220 toward the back panel 222 can allow the control tether 252 to slacken again, which can thereby allow the patch 204 to be forced from the inverted orientation, invert in the opposite direction, and/or otherwise be forced back through or out of the aperture 206 to the exterior of the airbag cushion 210, such as is shown in FIG. 4. Airbag inflation gases are thus permitted to pass through the venting aperture 206 and normal restraint venting is permitted when the active vent 202 is in this open configuration. As can be appreciated from the foregoing, in various embodiments, the active vent 202 can be activated (e.g., opened from a closed position) by displacement of the front panel.

In other instances, such as when the vehicle occupant is in an OOP condition, the vehicle occupant may contact the front panel 220 before the control tether 252 has become taut and, thus, before the patch 204 has closed the venting aperture 206. As a result, the control tether 252 may remain relatively slack, the active vent 202 may remain open, and inflation gases can exit through the aperture 206. In certain instances, the active vent 202 may never close during an OOP condition deployment event. Such venting at earlier (and, in some instances, all) stages of OOP conditions can reduce injury to the OOP occupant.

The patch 204 may be formed of any suitable material. In some embodiments, the patch 204 is formed of base fabric material or any other suitable fabric. For example, the patch 204 may be formed of the same material as that used to form one or more of the front panel 220 and/or the back panel 222. The patch 204 may be coated (e.g., silicone coating) or uncoated. In other embodiments, the patch 204 may include a round vent seal 205 on an inner surface of the patch 204. The vent seal 205 may be made from a coated fabric sized similar to the diameter of the aperture 206 to increase sealing of the active vent 202 in the closed state.

The control tether 252 may be formed of any suitable material. In some embodiments, the control tether 252 is formed from a webbing of the base fabric material from which the panels 220, 222 of the airbag cushion 210 are formed.

In some embodiments, the front panel 220 and/or the back panel 222 may be formed of an integral piece of material, rather than two pieces of material stitched together. In certain embodiments, the front panel 220 and the back panel 222 may be woven together to form an integral piece of material.

Figure 5A:
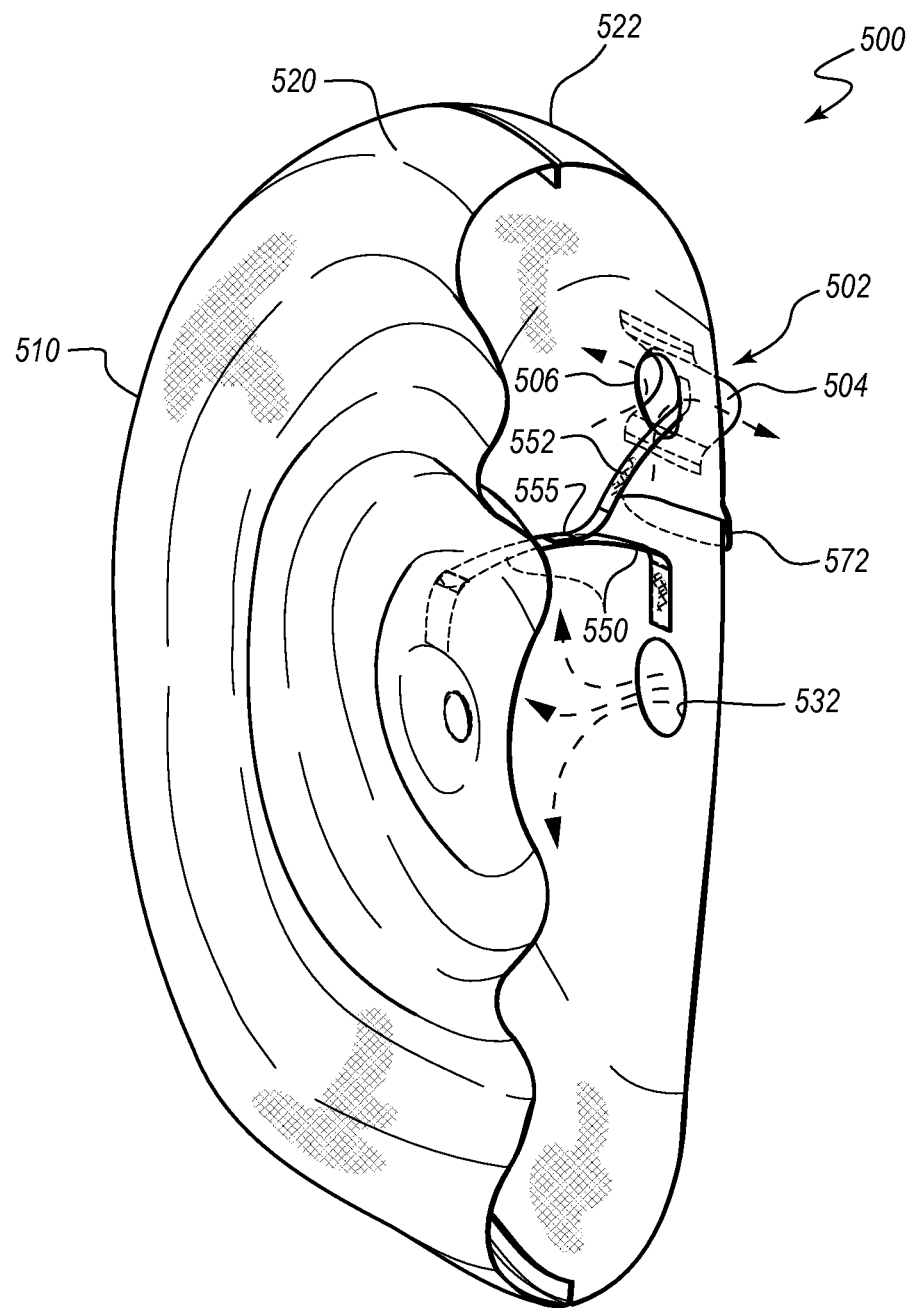
FIG. 5A is a rearwardly directed cross-sectional perspective view of another embodiment of an airbag assembly in which an embodiment of an active vent is initially in an open OOP venting state.
Figure 5B:
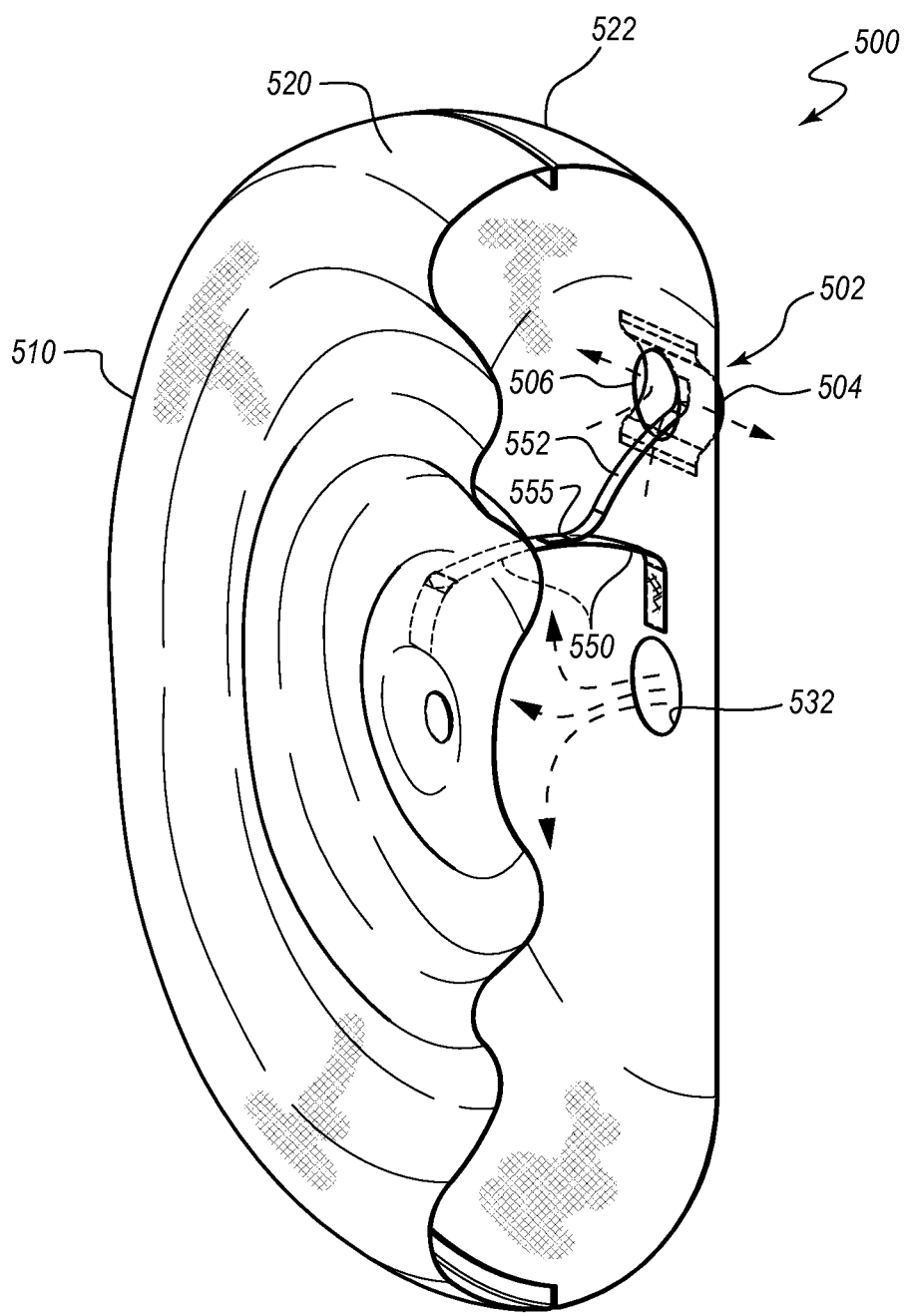
FIG. 5B is a rearwardly directed cross-sectional perspective view of the airbag assembly of FIG. 5A in a partially inflated state in which the active vent is in an open restraint venting state.
Figure 5C:
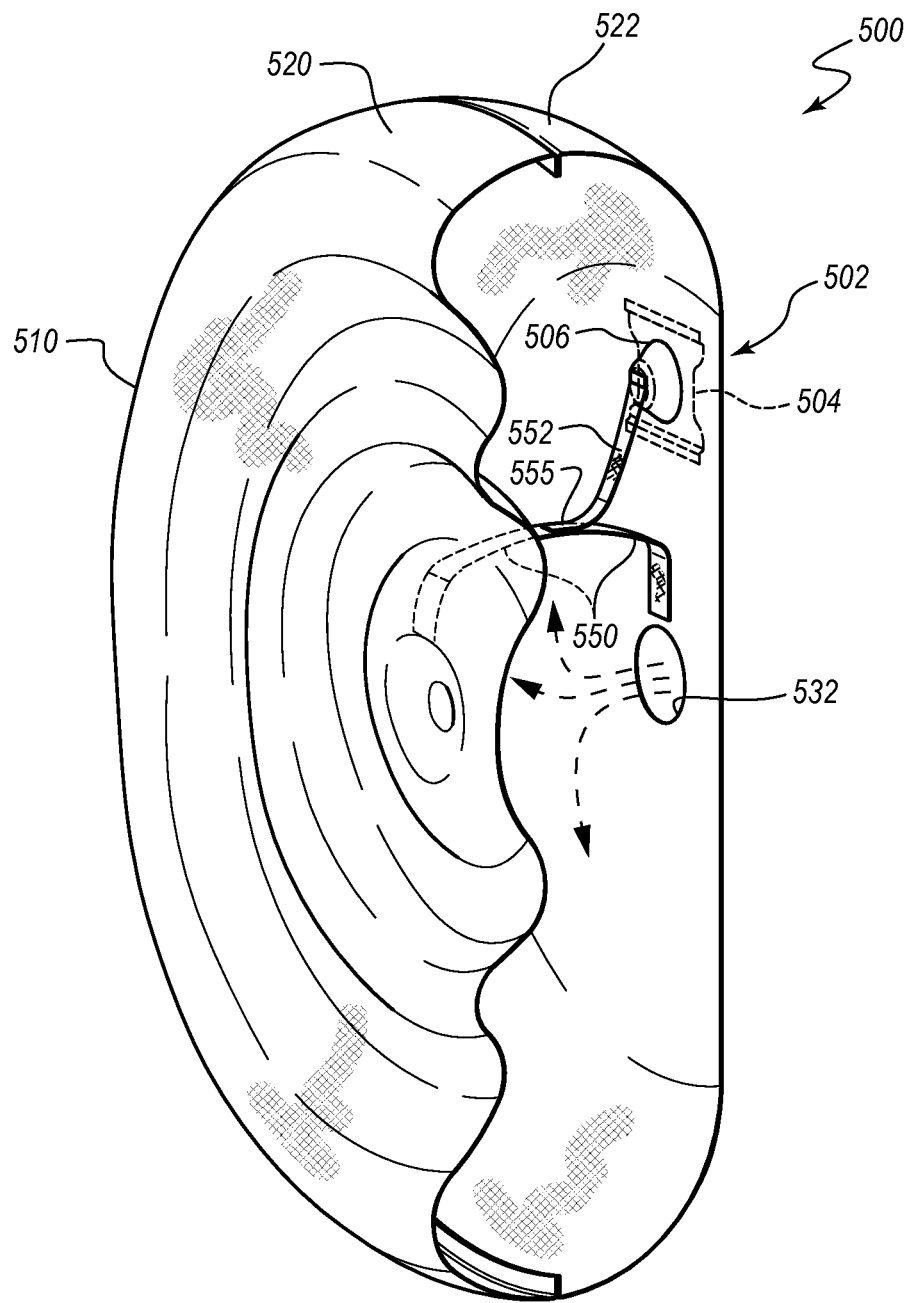
FIG. 5C is a rearwardly directed cross-sectional perspective view of the airbag assembly of FIG. 5A in a partially inflated state in which an embodiment of an active vent is in a closed state.
Figure 6A:
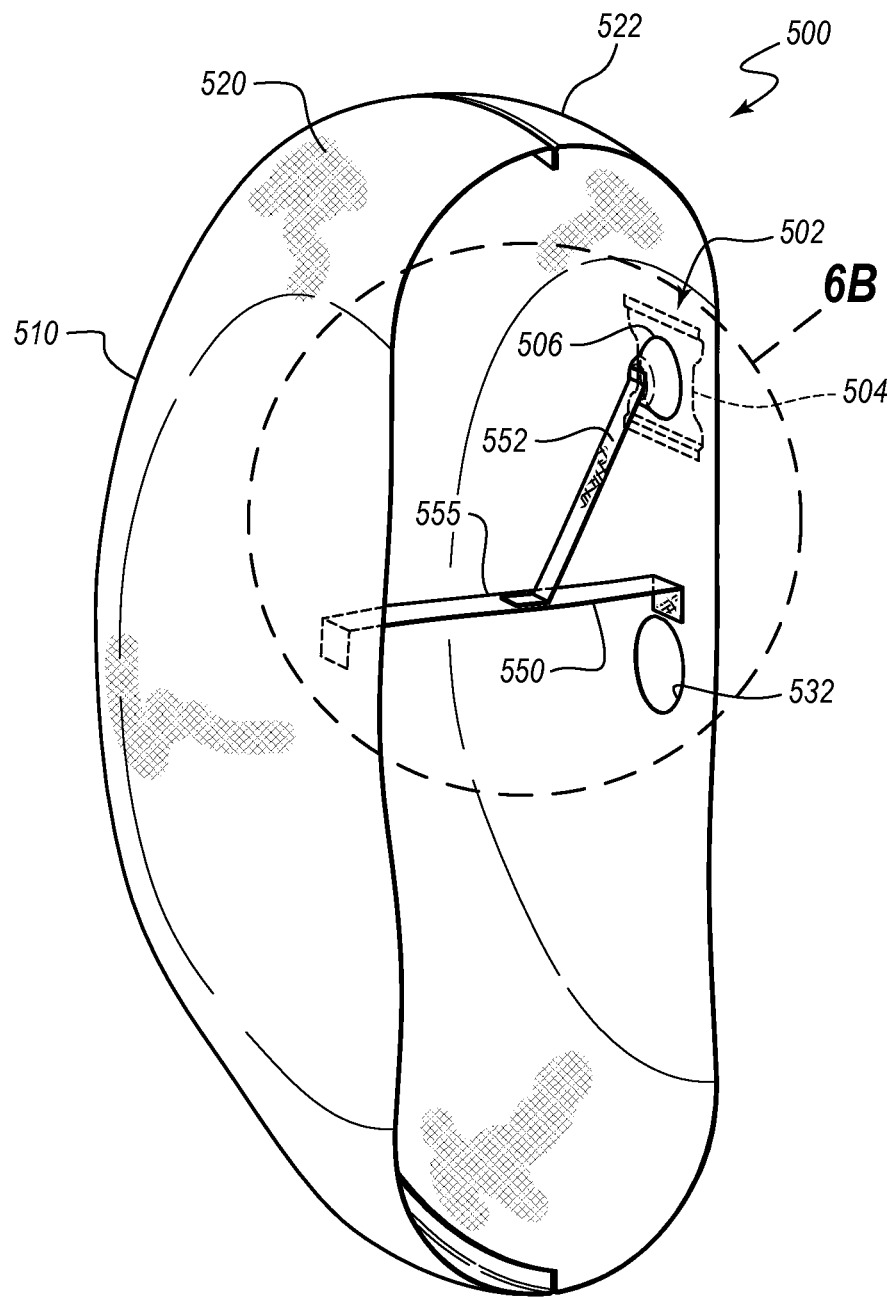
FIG. 6A is a rearwardly directed cross-sectional perspective view of the airbag assembly of FIG. 5A in a fully inflated state.
Figure 6B:
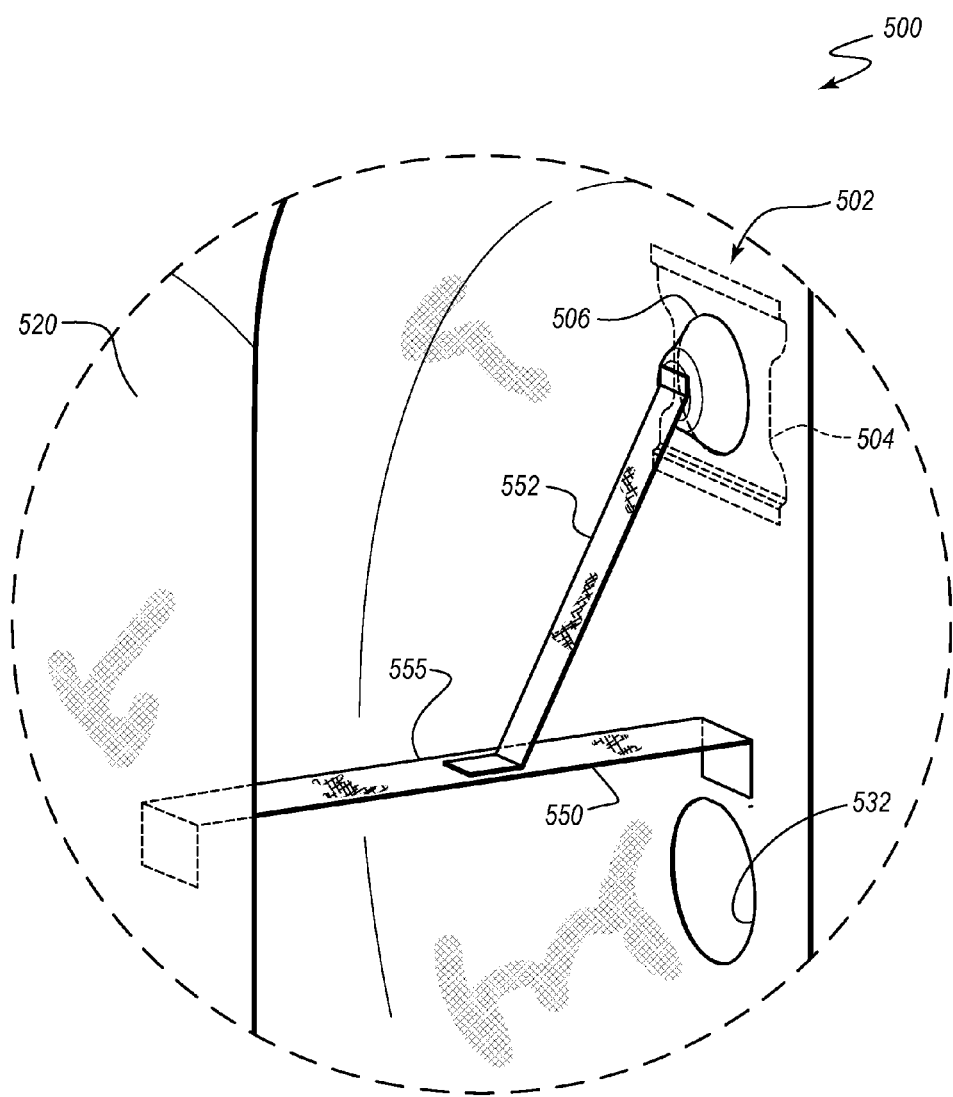
FIG. 6B is an enlarged view of FIG. 6A.

FIGS. 5A-5C and 6A-6B depict an airbag assembly 500, according to another embodiment of the present disclosure. Specifically, FIG. 5A is a rearwardly directed cross-sectional perspective view of the airbag assembly 500 with an active vent 502 initially in an open OOP venting state. FIG. 5B is a rearwardly directed cross-sectional perspective view of the airbag assembly 500 in a partially inflated state in which the active vent 502 is in an open restraint venting state. FIG. 5C is a rearwardly directed cross-sectional perspective view of the airbag assembly 500 in a partially inflated state in which the active vent is in a closed state. FIG. 6A is a rearwardly directed cross-sectional perspective view of the airbag assembly 500 in a fully inflated state. FIG. 6B is an enlarged view of FIG. 6A.

Referring generally and collectively to FIGS. 5A-5B and 6A-6B, the airbag assembly 500 can include an airbag cushion 510 that includes a front panel 520, a back panel 522, and a selectively closable discrete vent 502, or active vent 502. The active bent 502 includes a plug 504 that is configured to selectively interact with an aperture 506 to close the aperture 506. The plug 504 may comprise a patch 504 that is attached to an airbag cushion 510. The patch 504 may be similar to, and interact with the aperture 506 similar to, the embodiment shown in FIG. 2A, as described above. The back panel may define an inflation aperture 532 to receive inflation gases from an inflator.

The airbag assembly 500 can include an occupant tether 550 that extends from the front panel 520 of the airbag cushion 510 to the back panel 522 of the airbag cushion and is coupled with each of the front panel 520 and the back panel 522. The occupant tether 550 can assist with achieving a desired profile of the airbag cushion 510 during deployment, once the airbag cushion 510 is fully inflated, and/or during ride-down of a vehicle occupant after the vehicle occupant impacts the inflated airbag cushion 510.

A control tether 552 (or pull cord) may be coupled with the patch 504 and also coupled to the occupant tether 550. In some embodiments, the control tether 552 is coupled to the patch 504 at one end and is coupled with occupant tether 550 (and thereby also coupled to the front panel 520) at an opposite end, as depicted in FIGS. 5A-5B and 6A-6B. The control tether 552 may couple to the occupant tether 550 at a coupling position 555 along a length of the occupant tether 550.

Initially, when the airbag cushion 510 is in a folded state, before deployment and/or inflation, the control tether 552 may be in a slack condition with sufficient slack to allow the patch 504 to be in an OOP venting state, which may be fully disengaged, or nearly fully disengaged, from the aperture 506. In other words, the slack in the control tether 552 may be sufficient to allow the patch 504 to be sufficiently displaced from the aperture 506 to allow unobstructed egress of inflation gases through the aperture 506, which may be sized to allow venting at a rate appropriate for an OOP condition.

The initial slack in the control tether 552 may be achieved a number of ways, including any method and/or mechanism described above. For example, the airbag cushion 510 may be folded initially to include a tuck or fold 572 that decreases a distance between the patch 504 (and thereby the aperture 506) and the opposite end of the control tether 552 that may be secured to the occupant tether 550. As another example, the control tether 552 may be tack stitched to secure the control tether to the back panel 522 in a manner that puts at least a portion of the control tether 552 in a slack condition relative to the patch 504 to permit the patch 504 to be initially disposed in the OOP venting state. The tack stitch may be burst as the airbag cushion 510 expands during inflation.

In certain embodiments, once a degree of inflation of the airbag cushion 510 is achieved (e.g., no OOP condition exists), the active vent 502 may transition out of the OOP venting state. For example, the tuck 572 may be pulled out of the back panel 522 (as shown in FIG. 5B) and/or the tack stitch securing the control tether in a slack condition may be burst. The transition out of the OOP venting state may be permanent, such that through deployment, restraint, and/or ride-down the active vent 502 is limited to transitions between the restraint venting state and the closed state.

Operation of the airbag assembly 500 can proceed similar to the airbag assembly 200 described above. For example, in some embodiments, the active vent 502 may be initially open because the control tether 552 is in a slack condition. In some embodiments, the airbag assembly 500 is assembled such that the control tether 552 is originally in the slack condition, such that during the initial stages of airbag inflation, the control tether 552 is slack, as shown in FIG. 5A. If a vehicle occupant is not in close proximity to the airbag cushion 510 during these early stages of airbag deployment, the airbag cushion 510 is allowed to expand in the direction of the normally seated occupant (e.g., the x-direction). As this expansion occurs, the occupant tether 550 is drawn to a taut condition. As the occupant tether 550 is drawn taut, in turn the control tether 552 is drawn taut. The control tether 552 draws the patch 504 from the OOP venting state (as shown in FIG. 5A) to the restraint venting state (as shown in FIG. 5B).

Further expansion causes the control tether 552 to pull a portion of the patch 504 through (e.g., internally relative to) the aperture 506 to prevent gas leakage during normal restraint conditions, such as is shown in FIG. 5C. Relative timing of closure of the active vent 502 during inflation may correlate to the coupling position 555 at which the control tether 552 couples to the occupant tether 550. Stated otherwise, the control tether 552 that is attached to the patch 504 can be pulled taut during the course of inflation of the airbag cushion 510 by the occupant tether 550. The drawing of the control tether 552 to a taut condition can invert the patch 504 through the aperture 506 and thereby plug the aperture 506 or otherwise close the active vent 502. The plugging of the aperture 506 may prevent or inhibit egress of the inflation gases through the aperture 506. The airbag cushion 510 may reach a full inflation state, such as shown in FIG. 6A.

The control tether 552 may remain in the taut condition until loading by the normally seated vehicle occupant occurs. Upon such loading, the front panel 520 of the cushion 510 can collapse with the ride-down of the occupant. This translation of the front panel 520 toward the back panel 522 can allow the occupant tether 550 to slacken again, which in turn can allow the control tether 552 to slacken again, which can thereby allow the patch 504 to be forced from the inverted orientation (e.g., invert again in the opposite direction) and/or otherwise be forced back through or out of the aperture 506 to the exterior of the airbag cushion 510. Airbag gases are thus permitted to pass through the venting aperture 506, and thus normal restraint venting is permitted when the active vent 502 is in this open configuration. As can be appreciated from the foregoing, in various embodiments, the active vent 502 can be activated (e.g., opened from a closed position) by displacement of the front panel 520.

In other instances, such as when the vehicle occupant is in an OOP condition, the vehicle occupant may contact the front panel 520 before the control tether 552 has become taut and, thus, before the patch 504 has closed the venting aperture 506. As a result, the control tether 552 may remain relatively slack, the active vent 502 may remain open, and inflation gases can exit through the aperture 506. Such venting at earlier (and, in some instances, all) stages of OOP conditions can reduce injury to the OOP occupant.

Relative timing of closure of an active vent during inflation may correlate to a position at which the control tether couples to the occupant tether. For example, with reference again to FIG. 5A, when the coupling position 555 is relatively close to the back panel 522 along the length of the occupant tether 550, activation of the active vent 502 may begin more quickly and the active vent 502 may be drawn closed relatively quickly in earlier stages of deployment. By contrast, when the coupling position 555 is relatively far from the back panel 522 along the length of the occupant tether 550, activation of the active vent 502 may begin more slowly and the active vent 502 may be drawn closed in later stages of deployment. In this manner, the coupling position 555 may be configured so as to tune the airbag assembly 500 for a desired performance.

Figure 7A:
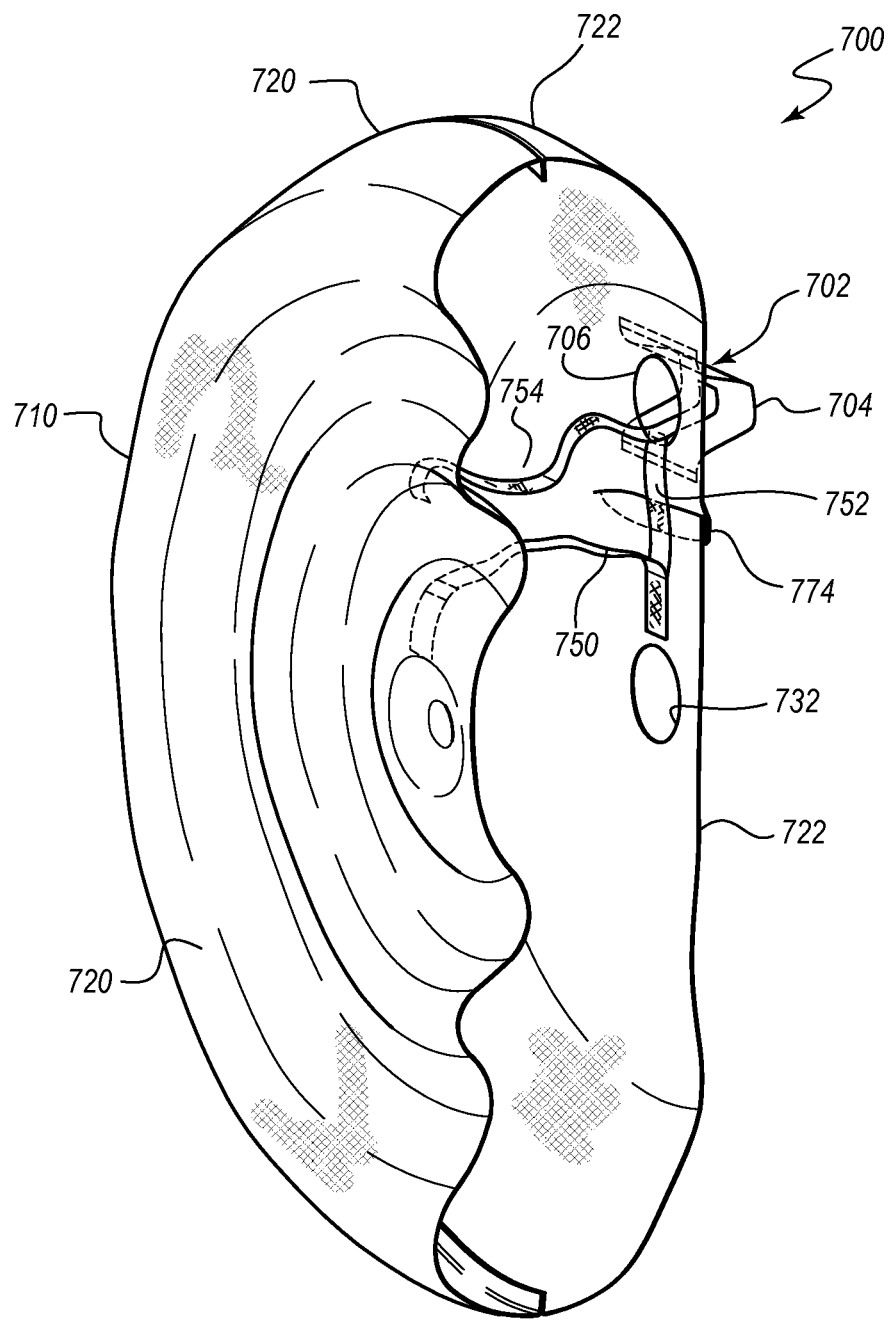
FIG. 7A is a rearwardly directed cross-sectional perspective view of another embodiment of an airbag assembly in which an embodiment of an active vent is initially in an open OOP venting state.
Figure 7B:
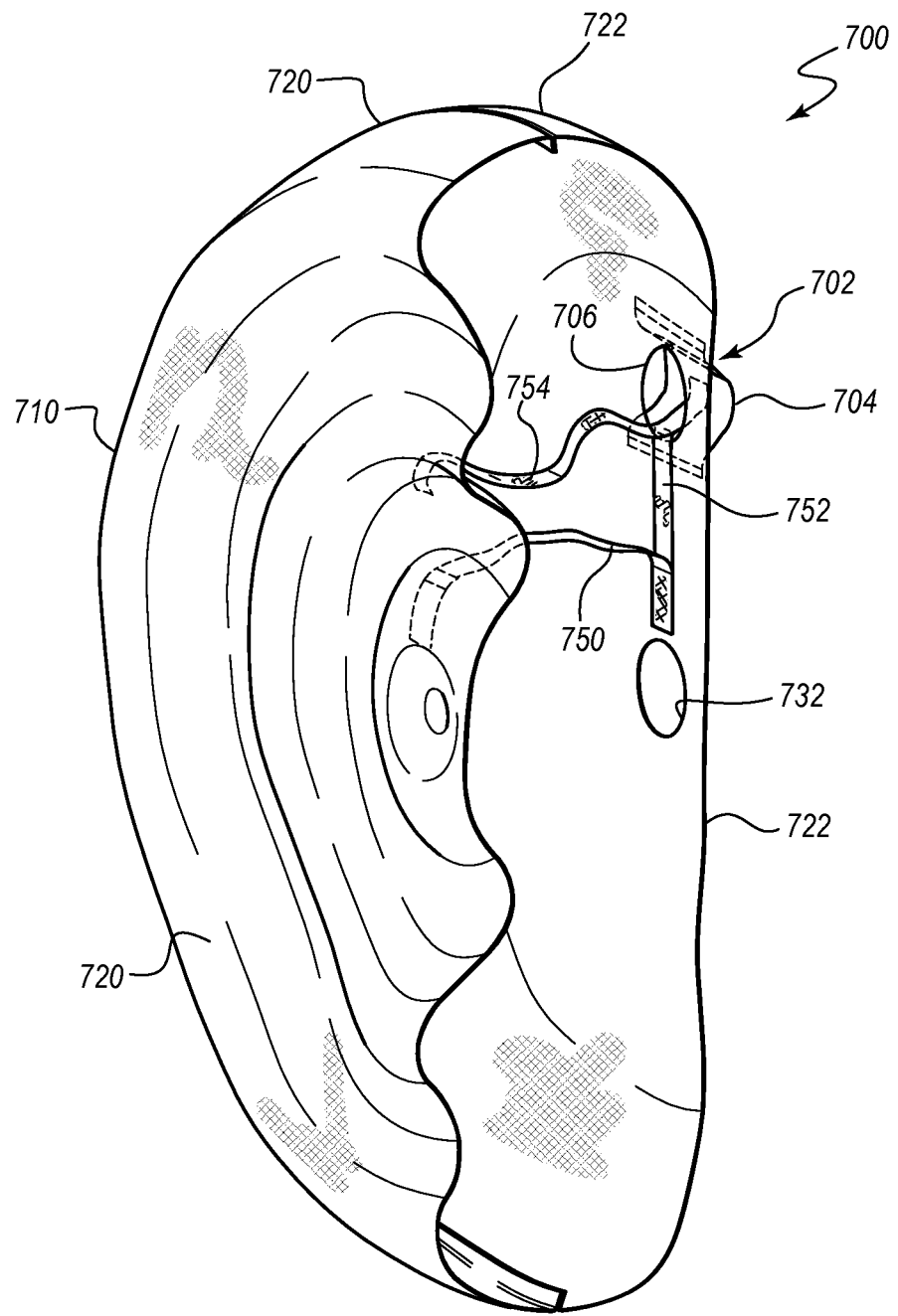
FIG. 7B is a rearwardly directed cross-sectional perspective view of the airbag assembly of FIG. 7A in a partially inflated state in which the active vent is in an open restraint venting state.
Figure 7C:
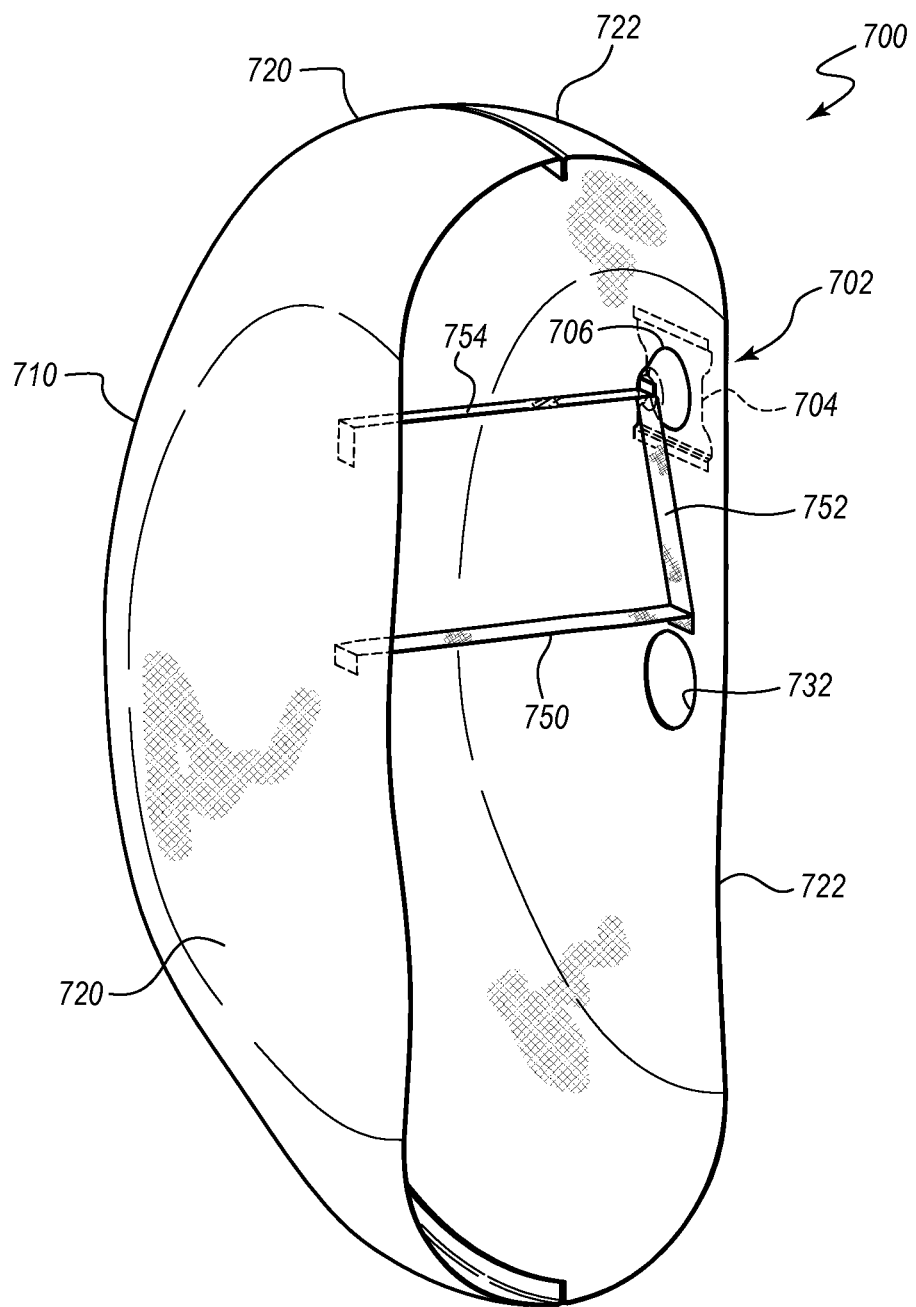
FIG. 7C is a rearwardly directed cross-sectional perspective view of the airbag assembly of FIG. 7A in a fully inflated state in which the active vent is in a closed state.

FIGS. 7A-7C depict an airbag assembly 700, according to another embodiment of the present disclosure. Specifically, FIG. 7A is a rearwardly directed cross-sectional perspective view of the airbag assembly 700 in which an embodiment of an active vent 702 is in an open OOP venting state. FIG. 7B is a rearwardly directed cross-sectional perspective view of the airbag assembly 900 in a partially inflated state in which the active vent 902 is in an open restraint venting state. FIG. 7C is a rearwardly directed cross-sectional perspective view of the airbag assembly 700 in a fully inflated state in which the active vent is in a closed state;

Referring generally and collectively to FIGS. 7A-7C, the airbag assembly 700 can include an airbag cushion 710 that includes a front panel 720, a back panel 722, and a selectively closable discrete vent 702, or active vent 702. The active vent 702 includes a plug 704 that is configured to selectively interact with an aperture 706 to close the aperture 706. The plug 704 may comprise a patch 704 that is attached to an airbag cushion 710. In certain embodiments, the patch 704 may be similar to, and interact with the aperture 906 similar to, the embodiment shown in FIG. 2A, as described above.

The airbag assembly 700 can include an occupant tether 750 that extends from a front panel 720 of the airbag cushion 710 to a back panel 722 of the airbag cushion 710 and is coupled with each of the front panel 720 and the back panel 722. The occupant tether 750 can assist with achieving a desired profile of the airbag cushion 710 during deployment, once the airbag cushion 710 is fully inflated, and/or during ride-down of a vehicle occupant after the vehicle occupant impacts the inflated airbag cushion 710.

A first control tether 752 may be coupled with the patch 704 and also coupled to the back panel 722, as illustrated in FIG. 7A. In another embodiment the first control tether 752 may couple to the occupant tether 750 (similar to the arrangement shown in the embodiment of FIGS. 5A-5C).

Initially, when the airbag cushion 710 is in a folded state, before deployment and/or inflation, the first control tether 752 may be in a slack condition with sufficient slack to allow the patch 704 to be in an OOP venting state, which may be fully disengaged, or nearly fully disengaged, from the aperture 706. In other words, the slack in the first control tether 752 may be sufficient to allow the patch 704 to be sufficiently displaced from the aperture 706 to allow unobstructed egress of inflation gases through the aperture 706, which may be sized to allow venting at a rate appropriate for an OOP condition.

A desired initial slack in the first control tether 752 may be achieved a number of ways, including any method and/or mechanism described above. For example, as illustrated in FIG. 7A, the airbag cushion 710 may be folded initially to include a tuck or fold 974 that decreases a distance between the patch 704 (and thereby the aperture 706) and the opposite end of the first control tether 752 that may be secured to the back panel 722. The tuck 774 may be pulled out of the back panel 722 as the airbag cushion inflates. As the tuck 774 is pulled out, the first control tether 752 is drawn taut, which may pull the patch 704 toward the aperture, thereby transitioning the active vent 702 from the OOP venting state to the restraint venting state.

A second control tether 754 may be coupled with the patch 704 and also coupled to the front panel 720. The second control tether 754 may be configured to transition from a slack condition to a taut condition as the airbag cushion 710 expands during deployment. The second control tether 754 may be configured to close the active vent 702, transitioning it from the open restraint venting state to the closed state, as shown in FIG. 7C.

The second control tether 754 is also configured to transition from the taut condition back to the slack condition to open the active vent 702 due to movement of the front panel 720 of the airbag cushion 710 toward the back panel 722 of the airbag cushion 710 as the airbag cushion 710 collapses due to restraint of the vehicle occupant during ride-down. The second control tether 754 may remain in the taut condition until loading by the normally seated vehicle occupant occurs. Upon such loading, the front panel 720 of the cushion 710 can collapse with the ride-down of the occupant. This translation of the front panel 720 toward the back panel 722 can allow the second control tether 754 to slacken again, which can thereby allow the patch 704 to disengage from the aperture 706. Airbag gases are thus permitted to pass through the aperture 706, and thus normal restraint venting is permitted when the active vent 702 is transitioned to this open restraint venting configuration. The first control tether 752 may remain taut, which may prevent the active vent 702 from transitioning from the open restraint venting state to the open OOP venting state. In other words, the first control tether 752 may limit the amount of external travel of the patch 704 (or how loose the patch 704 can be relative to the aperture 706) once the cushion is expanded beyond a point where an OOP condition would limit expansion. Thus, appropriate restraint venting may be assured once the airbag cushion expands past the initial state with the tuck 774 when an OOP condition is not encountered.

Figure 8:
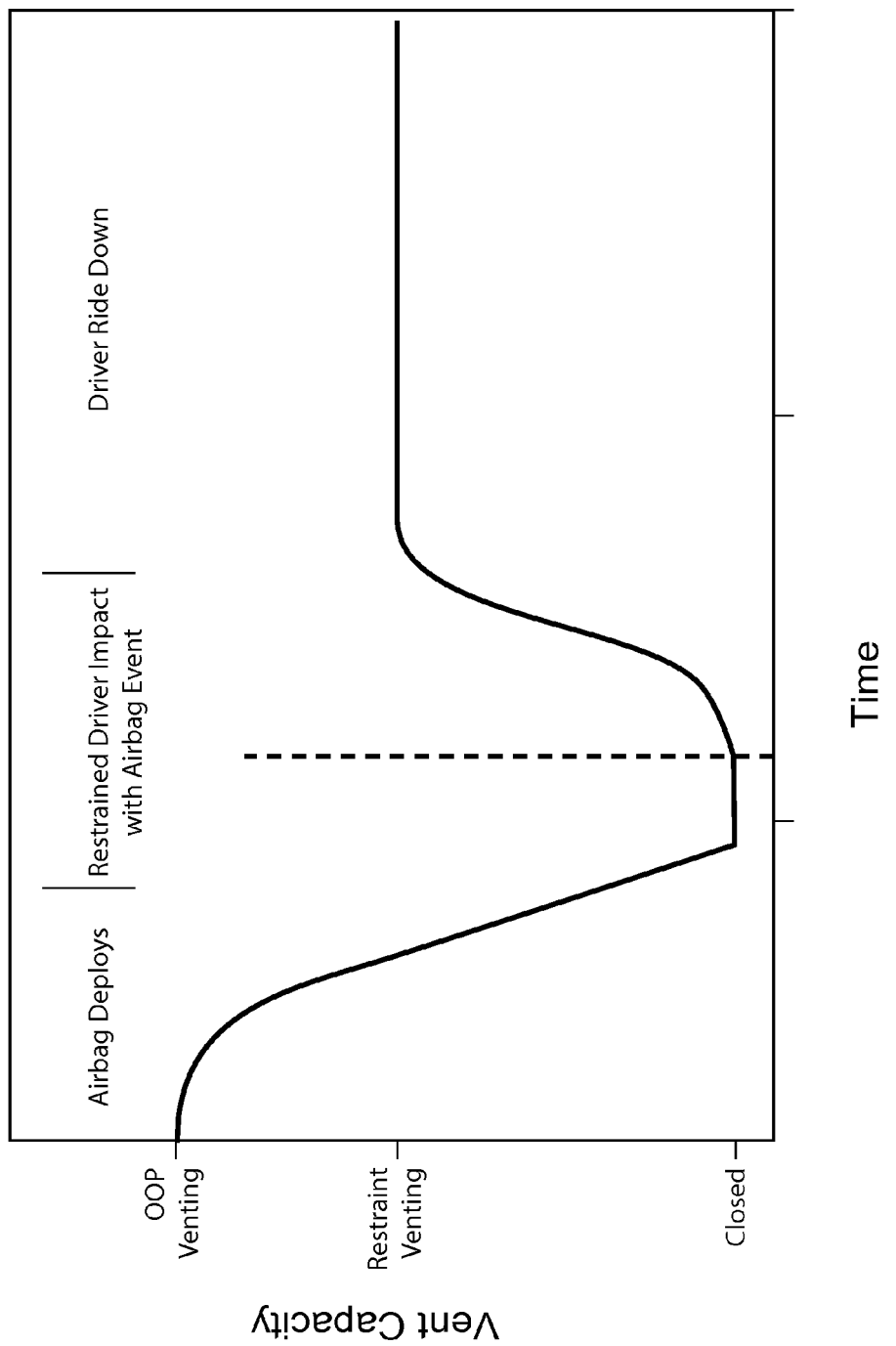
FIG. 8 is a graph showing capacity of an active vent, according to one embodiment, as a function of time.

FIG. 8 is a graph showing venting capacity of an active vent, according to one embodiment, as a function of time. The graph illustrates that initially, such as when the airbag cushion is still in a collapsed or packaged configuration, the active vent may be at a maximum venting capacity, such as an OOP venting capacity, because the active vent is in the OOP venting state. Shortly after initiation of deployment, the airbag cushion begins to expand, assuming an OOP condition is not present that would prevent expansion maintain the active vent in the OOP venting state. Expansion of the airbag cushion may draw taut a tether or otherwise reduce slack on a tether that in turn draws the active vent to the restraint venting state and/or to the closed state. In the closed state, the venting capacity of the active vent is zero, because the vent is sealed or otherwise plugged by a patch. An occupant impacting the airbag cushion may result in slack on the tether, which may allow the active vent to slightly open, which may gradually allow egress of inflation gases and in turn allow gradual transition of the active vent to the restraint venting state. When the active vent is in the restraint venting state, the vent capacity may be limited to a restraint venting rate that is appropriate for occupant ride down. As can be appreciated, the graph of FIG. 8 may be an approximation to illustrate timing of the three distinct states of an active vent—namely OOP venting state, restraint venting state, and closed state. A graph corresponding to an actual embodiment may differ from the graph of FIG. 8.

Figure 9A:
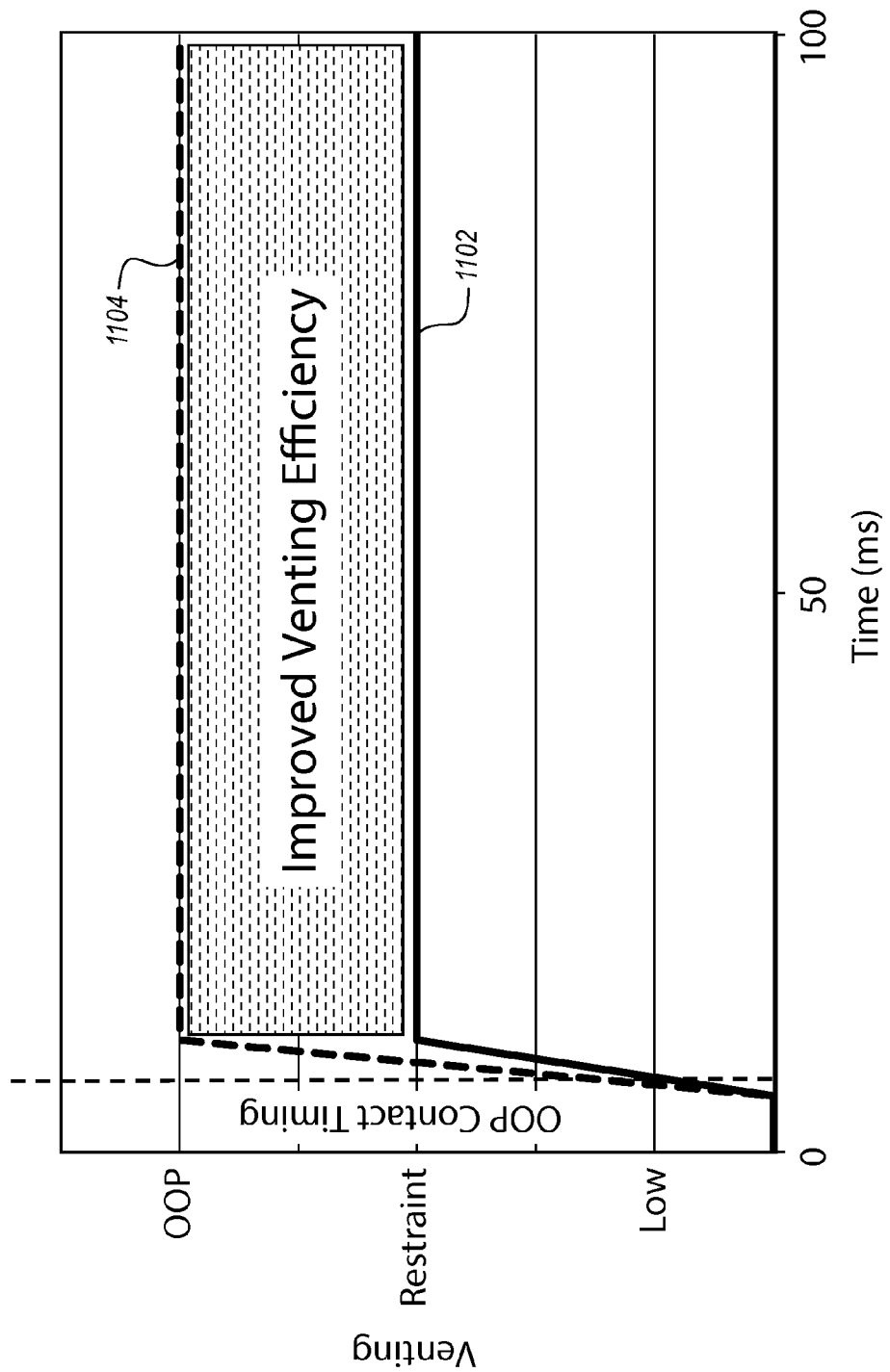
FIG. 9A is a graph illustrating rate of venting as a function of time during an OOP load case condition for both a standard design airbag assembly with a typical discrete vent and an airbag assembly with an active vent according to the present disclosure.

FIG. 9A is a graph illustrating rate of venting as a function of time during an OOP load case condition for both a standard design airbag assembly with a typical discrete vent (represented by solid line 902) and an airbag assembly with an active vent according to the present disclosure (represented by broken line 904). An active vent, such as described in the foregoing embodiments, can provide a larger venting aperture (e.g., an aperture appropriate to vent inflation gases quickly enough to avoid vehicle occupant injury from the expanding airbag when the vehicle occupant is in an OOP condition). The larger aperture provides venting of inflation gases at an appropriate OOP venting rate, which is approximately two-thirds faster than a venting rate of a typical discrete valve of a standard design airbag assembly.

Without an active valve, an airbag assembly according to a standard design includes discrete vents designed to vent at a rate appropriate for restraint of the occupant, as indicated by line 902. The rate appropriate for restraint is less than an OOP venting rate because a restraint venting rate is slower to allow airbag inflation and occupant ride down and OOP venting rate is faster. The faster OOP venting rate helps reduce impact of the airbag (and possibly injury from such impact) to a vehicle occupant in an OOP condition. The graph of FIG. 9A illustrates improved venting efficiency for an OOP condition deployment. The active vent allows for a the larger venting capacity (OOP venting rate) of the OOP venting state while also enabling a restraint venting state for appropriate occupant ride down when an OOP condition is not present.

Figure 9B:
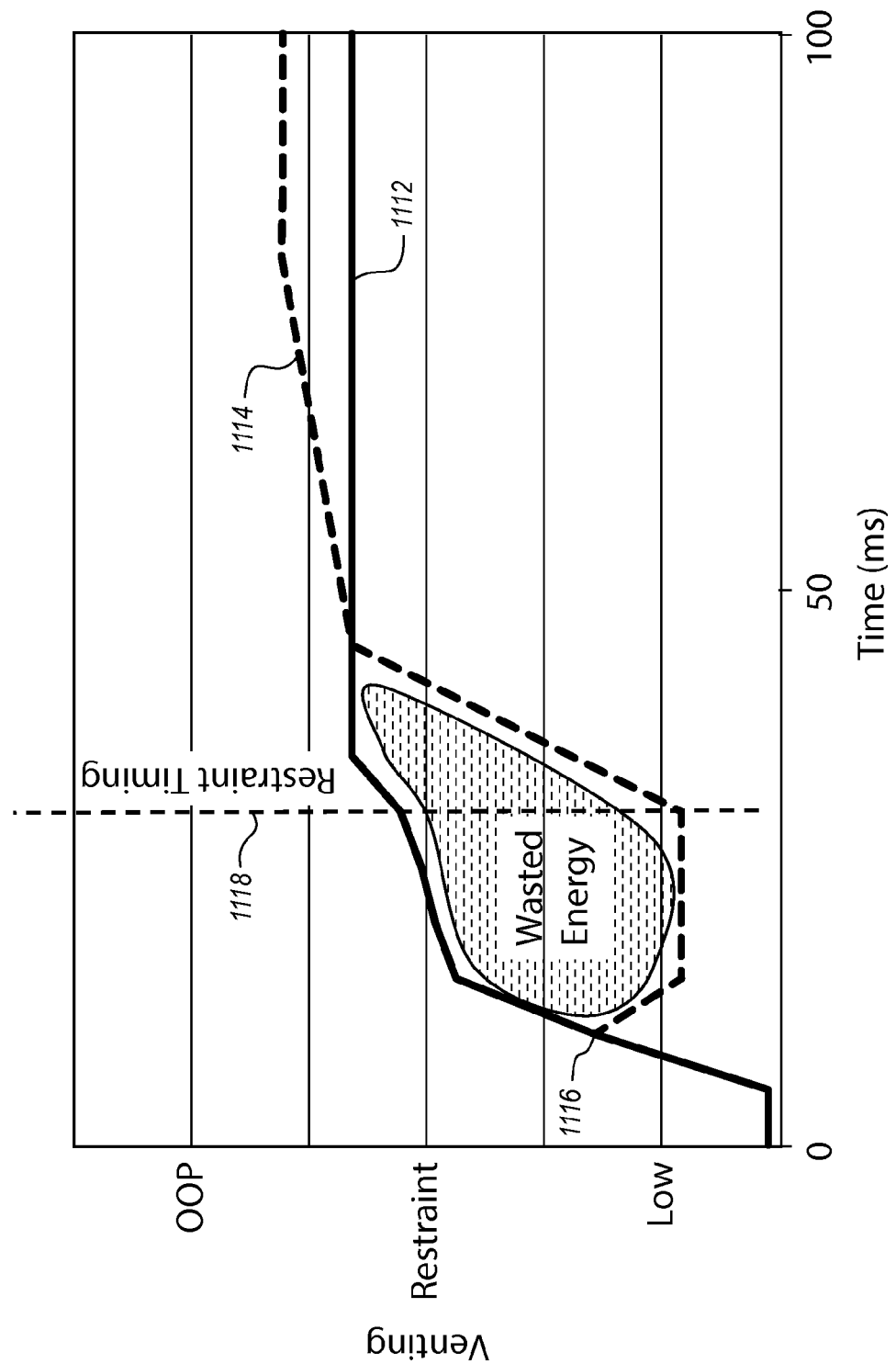
FIG. 9B is a graph illustrating rate of venting as a function of time during a normal restraint load case for both a standard design airbag assembly and an airbag assembly with an active vent according to the present disclosure.

FIG. 9B is a graph illustrating rate of venting as a function of time during a normal restraint load case for both a standard design airbag assembly (indicated by solid line 912) and an airbag assembly with an active vent according to the present disclosure (indicated by broken line 914). In a standard design, the discrete vent may be always open so venting gradually increases as the airbag inflates until a maximum venting rate is achieved (e.g., the maximum being limited by the size of the discrete vent to a rate of venting to appropriately restrain an occupant during ride-down). As illustrated by the graph, once the active vent closes (at point 916), venting is significantly low (and inflation gases are more fully retained) until a restraint load (at line 918), such as caused by an occupant contacting the airbag, at which point the venting rate gradually increases. The graph illustrates energy or gas wasted by a standard design. The wasted energy is energy expended to maintain inflation of the airbag at a level to provide sufficient restraint of an occupant. Wasted gas is inflation gas lost before occupant restraint through a standard vent without contributing to occupant restraint. The active vent retains the inflation gases until venting is needed, and is thus more efficient with the input energy from the inflator. Less input energy is needed to match the crash output energy, which means a smaller inflator is possible.

Figure 9C:
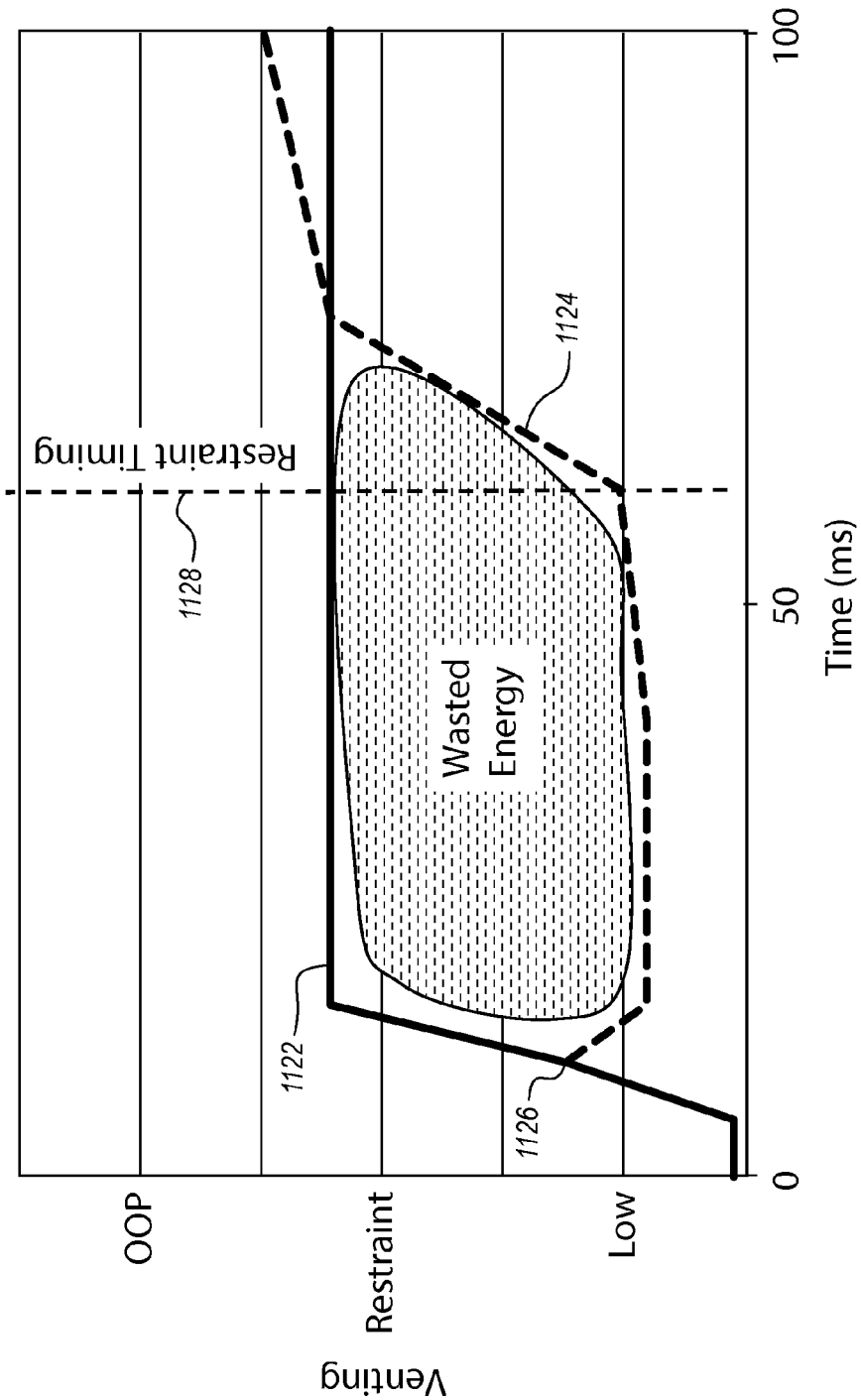
FIG. 9C is a graph illustrating rate of venting as a function of time during a long duration load case for both a standard design airbag assembly and an airbag assembly with an active vent according to the present disclosure.

FIG. 9C is a graph illustrating rate of venting as a function of time during a long duration load case for both a standard design airbag assembly (indicated by solid line 922) and an airbag assembly with an active vent according to the present disclosure (indicated by broken line 924). In a standard design, the discrete vent may be always open so venting gradually increases as the airbag inflates until a maximum venting rate is achieved (e.g., the maximum being limited by the size of the discrete vent to a rate of venting to appropriately restrain an occupant during ride-down). As illustrated by the graph, once the active vent closes (at point 926), venting is significantly low (and inflation gases are more fully retained) until a restraint load (at line 928), such as caused by an occupant contacting the airbag, at which point the venting rate gradually increases. The graph illustrates energy wasted by a standard design. The wasted energy is energy expended to maintain inflation of the airbag at a level to provide sufficient restraint of an occupant during ride-down. The active vent retains the inflation gases until venting is needed, and is thus more efficient with the input energy from the inflator. Less input energy is needed to match the crash output energy, which means a smaller inflator is possible. Moreover, in long duration load cases, the wasted energy/gas of the standard design is more noticeable. A standard vent would typically have insufficient gas remaining to provide adequate restraint in a long duration load case.

Figure 10A:
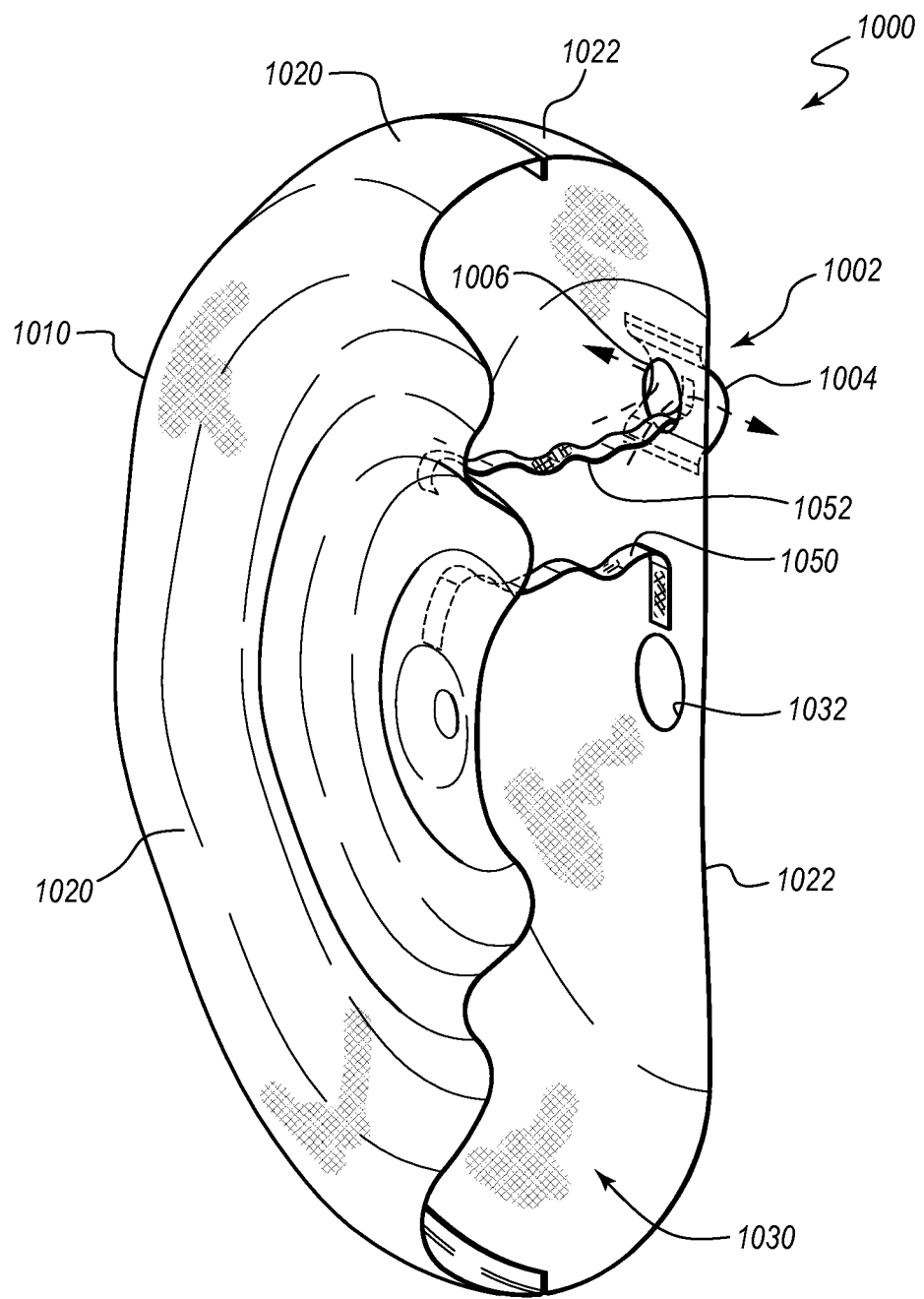
FIG. 10A is a rearwardly directed cross-sectional perspective view of another embodiment of an airbag assembly in a partially inflated state.
Figure 10B:
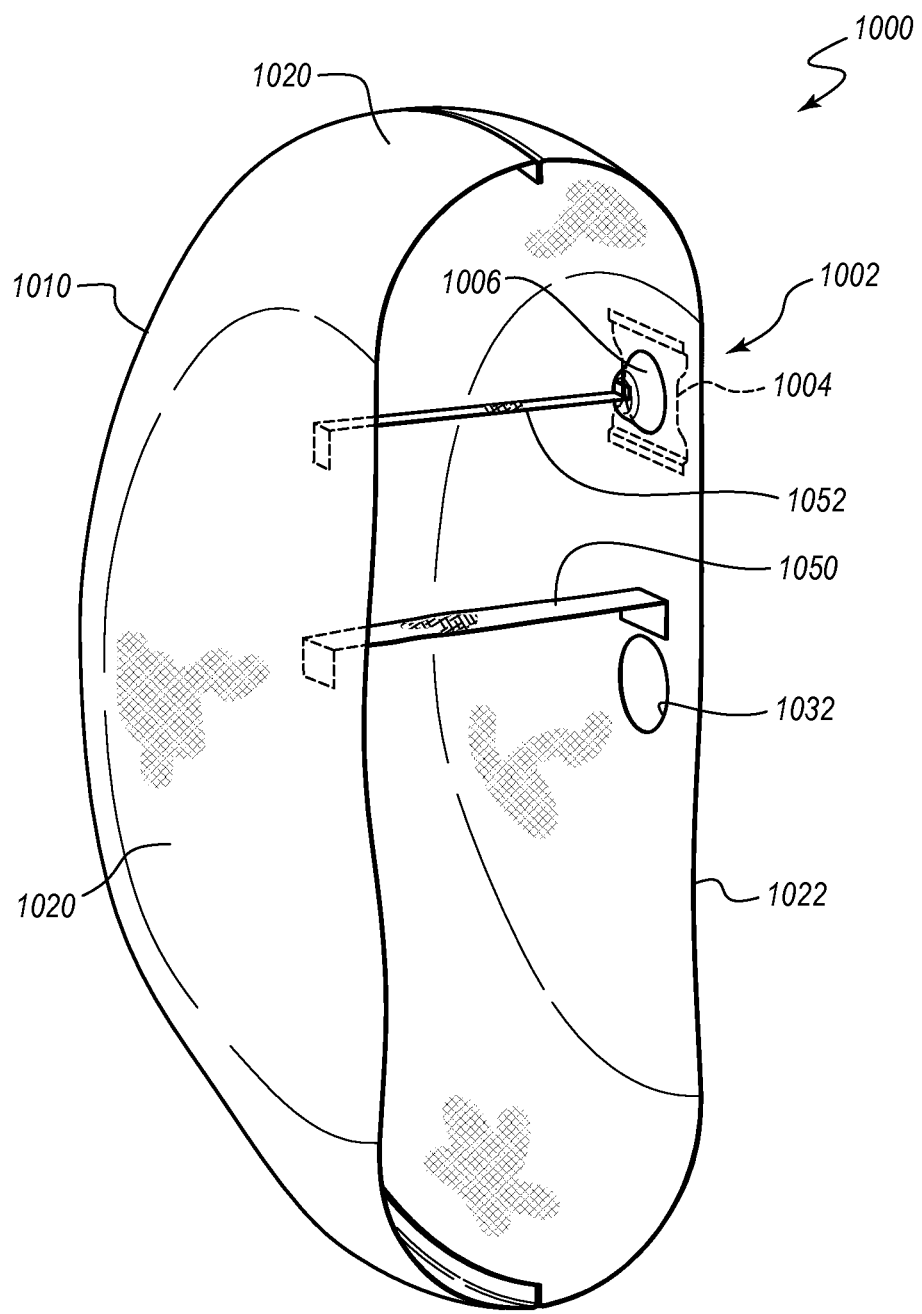
FIG. 10B is a rearwardly directed cross-sectional perspective view of the airbag assembly of FIG. 8A in a fully inflated state.

FIGS. 10A-10B depict an airbag assembly 1000, according to another embodiment of the present disclosure. Specifically, FIG. 10A is a rearwardly directed cross-sectional perspective view of the airbag assembly 1000. FIG. 10B is an enlarged view of FIG. 10A. The airbag assembly 1000 can include an airbag cushion 1010 and a selectively closable discrete vent 1002, or active vent 1002. The active vent 1002 may include, in some embodiments, an aperture 1006 and a plug 1004 (e.g., a patch 1004) that selectively interacts with the aperture 1006 to selectively close the aperture 1006. The airbag cushion 1010 comprises a front panel 1020 and a back panel 1022 that may be joined in any suitable manner, such as via stitching. The back panel 1022 defines an inflation aperture 1032 to fluidly couple to and receive inflation gases from an inflator into an inflation chamber 1030 of the airbag cushion 1010. Also, the active vent 1002 is disposed in the back panel 1022. As can be appreciated, the active vent 1002 may be disposed on another panel (e.g., a side panel).

The airbag assembly 1000 may include a control tether 1052 coupled to the plug 1004 at one end and coupled with the front panel 1020 at an opposite end. The active vent 1002 may be initially open because the control tether 1052 is in a slack condition. If a vehicle occupant is not in close proximity to the airbag cushion 1010 during these early stages of airbag deployment, the airbag cushion 1010 is allowed to expand in the direction of the normally seated occupant (e.g., the x-direction). As this expansion occurs, the control tether 1052 is drawn to a taut condition which pulls the plug 1004 into engagement with the aperture 1006 to prevent or inhibit egress of the inflation gases through the aperture 1006.

The control tether 1052 may remain in the taut condition until loading by the normally seated vehicle occupant occurs. Upon such loading, the front panel 1020 of the airbag cushion 1010 can collapse with the ride-down of the occupant. This translation of the front panel 1020 toward the back panel 1022 can allow the control tether 1052 to slacken again, which can thereby allow the plug 1004 to be forced from interaction with the aperture 1006. Airbag inflation gases are thus permitted to pass through the venting aperture 1006 and normal restraint venting is permitted when the active vent 1002 is in this open configuration.

In other instances, such as when the vehicle occupant is in an OOP condition, the vehicle occupant may contact the front panel 1020 before the plug 1004 has closed the venting aperture 1006. As a result, the control tether 1052 may remain relatively slack, the active vent 1002 may remain open, and inflation gases can exit through the aperture 1006. In certain instances, the active vent 1002 may never close during an OOP deployment event. Such venting at earlier (and, in some instances, all) stages of OOP conditions can reduce injury to the OOP occupant.

The airbag assembly 1000 may also include an occupant tether 1050, or a stabilizing tether or depth delimiting tether, which extends from the front panel 1020 to the back panel 1022 and is coupled with each of the front panel 1020 and the back panel 1022. The occupant tether 1050 can assist with achieving a desired profile of the airbag cushion 1010 during deployment, once the airbag cushion 1010 is fully inflated, and/or during ride-down of a vehicle occupant after the vehicle occupant impacts the inflated airbag cushion 1010.

Figure 11:
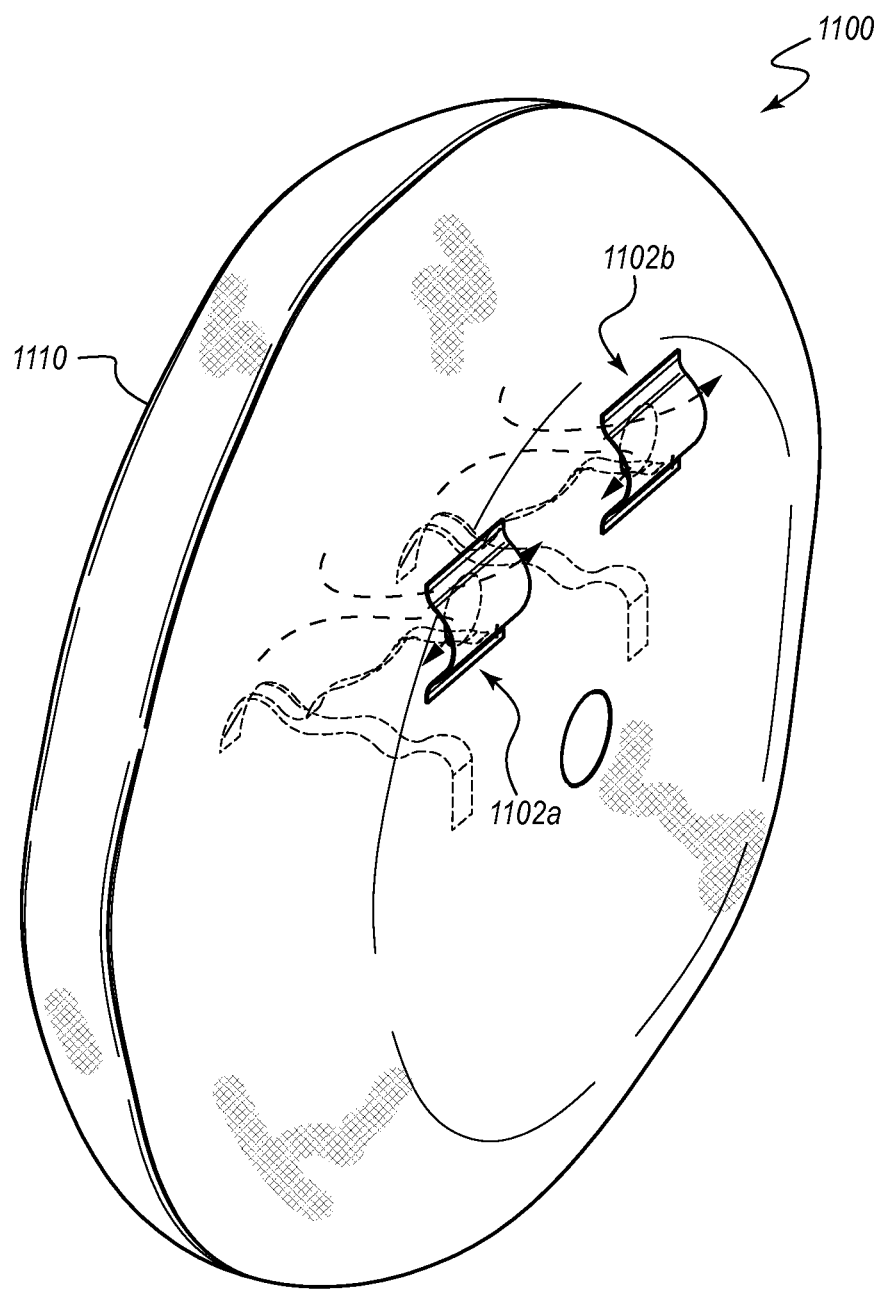
FIG. 11 is a forwardly directed perspective view of an embodiment of an airbag assembly including two active vents in an opened state.

FIG. 11 depicts an airbag assembly 1100, according to another embodiment of the present disclosure, that includes an airbag cushion 1110 with two active vents 1102a, 1102b. Specifically, FIG. 10A is a forwardly directed perspective view of the airbag assembly 1000 in which the two active vents 1102a, 1102b are in an open state. The two active vents 1102a, 1102b may be active vents according to any of the embodiments disclosed, described, or illustrated herein.

Other embodiments may differ significantly from what is shown in the drawings, in some respects. For example, in some embodiments, the patch may be shaped differently and/or may be attached to the airbag cushion in a variety of different ways. For example, in various embodiments, the patch may be triangular, square, rectangular, circular, hexagonal, or any other suitable shape. In various embodiments, the patch may be attached to the cushion at two or more, three or more, or four or more attachment regions (e.g., via stitches at two, three, or four or more positions). In some embodiments, the patch may be shaped as a square, and in further embodiments, a length of each side of the square can be greater than a diameter of the aperture. The square patch may, in some embodiments, be attached to the airbag cushion at only its four corners, which can allow gas to vent outwardly from the airbag cushion in four directions (as opposed to the two directions shown in the drawings). In other embodiments, the patch may be triangular, and may only be attached at the three corners. Gas may be permitted to vent in three directions (e.g., between three sets of adjacent stitched areas) when the patch is spaced from the aperture when the active vent is open.

In some embodiments, different arrangements of the tether are possible. For example, in some embodiments, the tether may include two or more discrete pieces. In some embodiments, one of the tether pieces is attached to the patch at one end and is attached to another tether piece at an opposite end. The additional tether piece may be attached to the front panel. Accordingly, coupling of the first tether piece to the patch may be a direct attachment, whereas coupling of the first tether piece to the front panel may be an indirect attachment. Similarly, whether the tether comprises one or multiple pieces, coupling of the tether to the front panel may be via a direct attachment (e.g., an end of the tether may be stitched to the front panel) or via an indirect attachment (e.g., an end of the tether may be stitched to an intermediate piece of material that is stitched to the front panel).

In some embodiments, the airbag may include one or more of a back panel, an upper panel, a lower panel, or one or more side panels. In certain of such embodiments, one or more apertures may be positioned in any suitable number of the panels, such as, for example, in the back panel only, in one of the side panels only, in the upper panel only, in both the back panel and one or more side panels, in two side panels only, etc.

In certain embodiments, the discrete venting aperture may be positioned in a panel that is not directly opposite from the front panel, which is configured to receive the vehicle occupant. For example, as mentioned above, in some embodiments, the venting aperture may be positioned in a side panel that is adjacent to the front panel. In further of such embodiments, the airbag cushion may include a back panel, and the side panel may extend in a generally forward-and-backward orientation between the front and back panels. The side panel may be said to face in a direction that is other than toward a vehicle occupant, or in a direction that is different from the direction in which the front panel faces. In certain embodiments, in which the venting aperture is positioned in the side panel, the tether may be attached to the front panel and may additionally be attached to the patch. The venting configuration may otherwise be similar to what is shown in the drawings—for example, the tether may be attached to the front panel at one end, the tether may extend through the venting aperture in the side panel when the tether is slack, and an end of the tether may be attached to the patch. The patch may be attached to the side panel at an exterior face thereof and may be configured to be drawn into, inverted by, or otherwise be pulled into gas-stopping interaction with the aperture when the tether is pulled taut due to inflation of the airbag. However, for OOP occupants that contact the front panel at an early stage of deployment, the airbag may never inflate by a sufficient amount to draw the tether taut, which can allow the active vent to remain open.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification, are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows in the claims.

I claim:

1. An airbag assembly comprising:
   an airbag cushion that defines an inflatable chamber into which inflation gases can be received to inflate the airbag cushion, wherein the airbag cushion comprises a first panel that is configured to face toward a vehicle occupant and a second panel that is configured to face in a direction that is other than toward the vehicle occupant during deployment of the airbag;
   an active vent that comprises:
      an aperture defined by the second panel; and
      a patch attached to the second panel and positioned at an exterior of the airbag cushion; and
   a control tether coupled at a first end to the patch and fixedly coupled at an opposite second end to a panel of the airbag cushion opposite the second panel,
   wherein the control tether is configured to transition from a slack condition to a taut condition as the cushion expands during deployment to transition the active vent from a high-rate venting capacity state that allows unobstructed venting through the aperture to a lower-rate venting capacity state that partially obstructs venting through the aperture, and
   wherein the control tether, in the taut condition as the cushion further expands during deployment, is further configured to transition the active vent from the lower-rate venting capacity state to a closed state.

2. The airbag assembly of claim 1, wherein the control tether is configured to draw the patch toward the aperture from a first position to a second position to transition the active vent from the high-rate venting capacity state in the first position, appropriate for an out-of-position condition, to the lower-rate venting capacity state in the second position, appropriate for restraining an occupant at impact and during ride down.

3. The airbag assembly of claim 1, wherein the control tether is coupled to the first panel, and wherein the control tether, in the taut condition as the cushion further expands during deployment, is further configured to pull a portion of the patch into engagement with the aperture to transition the active vent from the lower-rate venting capacity state to the closed state.

4. The airbag assembly of claim 1, wherein the control tether, in the taut condition as the cushion further expands during deployment, is further configured to pull a portion of the patch through the aperture toward an interior of the airbag cushion to transition the active vent to the closed state.

5. The airbag assembly of claim 1, wherein the control tether is configured to slacken to transition the active vent from the closed state to the lower-rate venting capacity state as the airbag collapses due to restraint of the occupant, the lower-rate venting capacity state appropriate to enable occupant ride-down.

6. The airbag assembly of claim 1, wherein the control tether is coupled to the first panel, and wherein the control tether is configured to transition to the taut condition as a distance between a position at which the control tether is coupled to the first panel and a position at which the control tether is coupled to the patch increases.

7. The airbag assembly of claim 1, wherein the first panel comprises a front panel relative to a perspective of the occupant and the second panel comprises a back panel positioned oppositely from the front panel.

8. The airbag assembly of claim 1, wherein the first panel comprises a front panel relative to a perspective of the occupant and the second panel comprises a side panel.

9. The airbag assembly of claim 1, wherein the control tether does not transition to the taut condition when an out-of-position condition results in early contact with the first panel.

10. The airbag assembly of claim 1, wherein, when the vehicle occupant is in an out-of-position condition, the control tether is configured to remain in a slack condition without transitioning the active vent from the first position throughout an entirety of the deployment of the airbag.

11. The airbag assembly of claim 1, wherein the control tether extends through the aperture when the control tether is in a slack condition.

12. The airbag assembly of claim 1, wherein the control tether permits the patch to be spaced from the second panel to permit inflation gases to egress from the airbag cushion through the aperture when the active vent is in an open state, including both the high-rate venting capacity state and the lower-rate venting capacity state.

13. The airbag assembly of claim 1, wherein a portion of the control tether is attached to the second panel.

14. The airbag assembly of claim 1, wherein the second panel further defines an inflation aperture that is configured to be coupled with an inflator.

15. The airbag assembly of claim 1, wherein the patch is attached to the exterior of the second panel by two seams, a first seam adjacent a first side of the aperture and a second seam adjacent a second side of the aperture.

16. The airbag assembly of claim 1, wherein the control tether transitioning from a slack condition to a taut condition transitions the active vent to the closed state by inverting the patch from a configuration in which the patch bows outwardly away from the airbag cushion to a configuration in which the patch bows inwardly to plug the aperture.

17. The airbag assembly of claim 1, further comprising an occupant tether attached to the first panel and the second panel,
wherein the control tether is coupled to the occupant tether to couple to the first panel,
wherein the occupant tether is configured to transition from a slack condition to a taut condition when the cushion expands during deployment to transition the control tether to a taut condition, and
wherein the occupant tether is configured to transition from the taut condition back to the slack condition due to movement of the first panel of the airbag to slacken the control tether.

18. The airbag assembly of claim 1, further comprising a second control tether coupled at a first end to the patch and coupled at an opposite second end to the first panel of the airbag cushion,
wherein the second control tether is configured to transition from a slack condition to a taut condition as the cushion expands during deployment to draw a portion of the patch into engagement with the aperture to transition the active vent to a closed state.

19. The airbag assembly of claim 1, wherein the control tether is configured to prevent the active vent from transitioning from the lower-rate venting capacity state back to the high-rate venting capacity state.

20. An airbag assembly comprising:
an airbag cushion that defines a cavity into which inflation gases can be received to inflate the airbag cushion, wherein the airbag cushion comprises a first panel that is configured to face toward a vehicle occupant and a second panel that is configured to face in a direction that is other than toward the vehicle occupant during deployment of the airbag;
an active vent that comprises:
an aperture defined by the second panel; and
a patch attached to the second panel at a first position adjacent a first side of the aperture and at a second position adjacent a second side of the aperture; and
a tether coupled to the first panel and coupled to the patch, wherein the tether is configured to transition from a slack condition that allows the active vent to be in a high-venting capacity state to a taut condition when the cushion expands during deployment to close the active vent by causing the patch to interact with the portion of the second panel that defines the aperture in a manner that prevents or inhibits inflation gases from exiting from an interior of the airbag cushion via the aperture, and the tether is configured to transition from the taut condition back to the slack condition to open the active vent to a low-venting capacity state by permitting the patch to discontinue interacting with the portion of the second panel that defines the aperture due to movement of the first panel of the airbag.

21. The airbag assembly of claim 20, wherein, when the vehicle occupant is in an out-of-position condition, the tether is configured to remain in the slack condition without closing the active vent throughout an entirety of the deployment of the airbag.

22. The airbag assembly of claim 20, wherein a portion of the tether is attached to the second panel.

23. An airbag assembly comprising:
an airbag cushion that defines an inflatable chamber into which inflation gases can be received to inflate the airbag cushion, wherein the airbag cushion comprises a first panel that is configured to face toward a vehicle occupant and a second panel that is configured to face in a direction that is other than toward the vehicle occupant during deployment of the airbag;
an active vent that comprises:
an aperture defined by the second panel; and
a patch attached to the second panel and positioned at an exterior of the airbag cushion; and
a control tether coupled to the first panel and coupled to the patch,
wherein the control tether is configured to transition from a slack condition to a taut condition as the cushion expands during deployment to transition the active vent from a first open state with a high-rate venting capacity appropriate for an out-of-position condition to a second open state with a lower-rate venting capacity appropriate for restraining an occupant at impact and during ride down, and further configured to transition the active vent to a closed state.

24. The airbag assembly of claim 23, wherein the control tether transitions the active vent to the closed state by pulling a portion of the patch through the aperture toward an interior of the airbag cushion.

25. The airbag assembly of claim 23, wherein the control tether is configured to slacken due to movement of the first panel of the airbag to allow the active vent transition from the closed state to an open state.

26. The airbag assembly of claim 20, wherein the control tether is configured to prevent the active vent from transitioning from the low-rate venting capacity state back to the high-rate venting capacity state.

27. The airbag assembly of claim 23, wherein the first control tether is configured to prevent the active vent from transitioning from the second open state with a lower-rate venting capacity back to the first open state with a high-rate venting capacity.

* * * * *